United States Patent
Regunathan et al.

(10) Patent No.: US 12,301,814 B2
(45) Date of Patent: *May 13, 2025

(54) PREDICTING A QUANTIZATION PARAMETER FOR A CURRENT UNIT USING QUANTIZATION PARAMETERS OF SPATIALLY NEIGHBORING UNITS

(71) Applicant: Microsoft Technology Licensing, LLC, Redmond, WA (US)

(72) Inventors: Shankar Regunathan, Bellevue, WA (US); Shijun Sun, Redmond, WA (US); Chengjie Tu, Sammamish, WA (US); Chih-Lung Lin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,224

(22) Filed: Jan. 31, 2024

(65) Prior Publication Data

US 2024/0171745 A1 May 23, 2024

Related U.S. Application Data

(63) Continuation of application No. 17/981,132, filed on Nov. 4, 2022, now Pat. No. 11,902,525, which is a
(Continued)

(51) Int. Cl.
*H04N 19/126* (2014.01)
*H04N 19/124* (2014.01)
(Continued)

(52) U.S. Cl.
CPC ......... *H04N 19/126* (2014.11); *H04N 19/124* (2014.11); *H04N 19/172* (2014.11);
(Continued)

(58) Field of Classification Search
CPC .. H04N 19/124; H04N 19/126; H04N 19/172; H04N 19/176; H04N 19/184;
(Continued)

(56) References Cited

U.S. PATENT DOCUMENTS

| 7,801,383 B2 | 9/2010 | Sullivan |
| 7,974,340 B2 | 7/2011 | Xia et al. |

(Continued)

OTHER PUBLICATIONS

Notice of Allowance dated Nov. 29, 2023, from U.S. Appl. No. 17/981,132, 8 pp.
(Continued)

*Primary Examiner* — Jessica M Prince
(74) *Attorney, Agent, or Firm* — Klarquist Sparkman, LLP

(57) ABSTRACT

Techniques and tools for encoding enhancement layer video with quantization that varies spatially and/or between color channels are presented, along with corresponding decoding techniques and tools. For example, an encoding tool determines whether quantization varies spatially over a picture, and the tool also determines whether quantization varies between color channels in the picture. The tool signals quantization parameters for macroblocks in the picture in an encoded bit stream. In some implementations, to signal the quantization parameters, the tool predicts the quantization parameters, and the quantization parameters are signaled with reference to the predicted quantization parameters. A decoding tool receives the encoded bit stream, predicts the quantization parameters, and uses the signaled information to determine the quantization parameters for the macroblocks of the enhancement layer video. The decoding tool performs inverse quantization that can vary spatially and/or between color channels.

20 Claims, 15 Drawing Sheets

Related U.S. Application Data continuation of application No. 17/404,832, filed on Aug. 17, 2021, now Pat. No. 11,528,481, which is a continuation of application No. 16/384,704, filed on Apr. 15, 2019, now Pat. No. 11,122,268, which is a continuation of application No. 15/391,609, filed on Dec. 27, 2016, now Pat. No. 10,306,227, which is a continuation of application No. 14/307,282, filed on Jun. 17, 2014, now Pat. No. 9,571,840, which is a continuation of application No. 12/156,864, filed on Jun. 3, 2008, now Pat. No. 8,897,359.

(51) Int. Cl.
| | |
|---|---|
| *H04N 19/172* | (2014.01) |
| *H04N 19/176* | (2014.01) |
| *H04N 19/186* | (2014.01) |
| *H04N 19/187* | (2014.01) |
| *H04N 19/196* | (2014.01) |
| *H04N 19/34* | (2014.01) |
| *H04N 19/46* | (2014.01) |
| *H04N 19/463* | (2014.01) |
| *H04N 19/593* | (2014.01) |
| *H04N 19/61* | (2014.01) |
| *H04N 19/70* | (2014.01) |
| *H04N 19/184* | (2014.01) |

(52) U.S. Cl.
CPC ......... *H04N 19/176* (2014.11); *H04N 19/186* (2014.11); *H04N 19/187* (2014.11); *H04N 19/196* (2014.11); *H04N 19/197* (2014.11); *H04N 19/34* (2014.11); *H04N 19/46* (2014.11); *H04N 19/463* (2014.11); *H04N 19/593* (2014.11); *H04N 19/61* (2014.11); *H04N 19/70* (2014.11); *H04N 19/184* (2014.11)

(58) Field of Classification Search
CPC .. H04N 19/186; H04N 19/187; H04N 19/196; H04N 19/197; H04N 19/34; H04N 19/46; H04N 19/463; H04N 19/593; H04N 19/61; H04N 19/70
See application file for complete search history.

(56) References Cited

U.S. PATENT DOCUMENTS

| | | |
|---|---|---|
| 7,995,649 B2 | 8/2011 | Zuo et al. |
| 8,059,721 B2 | 11/2011 | Chang et al. |
| 8,130,828 B2 | 3/2012 | Hsu et al. |
| 8,184,694 B2 | 5/2012 | Srinivasan |
| 8,189,933 B2 | 5/2012 | Holcomb et al. |
| 8,238,424 B2 | 8/2012 | Chang et al. |
| 8,243,797 B2 | 8/2012 | Lin et al. |
| 8,249,145 B2 | 8/2012 | Chang et al. |
| 8,331,438 B2 | 12/2012 | Chang et al. |
| 8,422,546 B2 | 4/2013 | Lin et al. |
| 8,442,337 B2 | 5/2013 | Zuo et al. |
| 8,498,335 B2 | 7/2013 | Holcomb et al. |
| 8,503,536 B2 | 8/2013 | Zuo et al. |
| 8,576,908 B2 | 11/2013 | Lin et al. |
| 8,588,298 B2 | 11/2013 | Srinivasan |
| 8,711,925 B2 | 4/2014 | Tu et al. |
| 8,767,822 B2 | 7/2014 | Zuo et al. |
| 8,897,359 B2 | 11/2014 | Regunathan et al. |
| 9,185,418 B2 | 11/2015 | Regunathan et al. |
| 9,571,840 B2 | 2/2017 | Regunathan et al. |
| 9,967,561 B2 | 5/2018 | Tu et al. |
| 10,306,227 B2 | 5/2019 | Regunathan et al. |
| 10,602,146 B2 | 3/2020 | Tu et al. |
| 10,958,907 B2 | 3/2021 | Tu et al. |
| 11,122,268 B2 | 9/2021 | Regunathan et al. |
| 11,343,503 B2 | 5/2022 | Tu et al. |
| 11,528,481 B2 | 12/2022 | Regunathan et al. |
| 11,778,186 B2 | 10/2023 | Tu et al. |
| 11,778,187 B2 | 10/2023 | Tu et al. |
| 11,843,775 B2 | 12/2023 | Tu et al. |
| 11,863,749 B2 | 1/2024 | Tu et al. |
| 11,902,525 B2 | 2/2024 | Regunathan et al. |
| 2005/0013500 A1 | 1/2005 | Lee et al. |
| 2005/0259730 A1 | 11/2005 | Sun |
| 2006/0018552 A1* | 1/2006 | Malayath ............. H04N 19/176 375/E7.226 |
| 2007/0036224 A1 | 2/2007 | Srinivasan et al. |
| 2007/0248163 A1 | 10/2007 | Zuo et al. |
| 2007/0248164 A1 | 10/2007 | Zuo et al. |
| 2007/0258518 A1 | 11/2007 | Tu et al. |
| 2008/0240252 A1* | 10/2008 | He ......................... H04N 19/86 375/E7.176 |
| 2008/0304562 A1* | 12/2008 | Chang .................... H04N 19/14 375/240.03 |
| 2011/0188769 A1* | 8/2011 | Fuchie ................... H04N 19/15 382/252 |
| 2022/0248021 A1* | 8/2022 | Tu ......................... H04N 19/124 |
| 2024/0163438 A1 | 5/2024 | Regunathan et al. |
| 2024/0171745 A1 | 5/2024 | Regunathan et al. |
| 2024/0195972 A1 | 6/2024 | Regunathan et al. |
| 2024/0195973 A1 | 6/2024 | Regunathan et al. |
| 2024/0251082 A1 | 7/2024 | Regunathan et al. |

OTHER PUBLICATIONS

Office Action dated Aug. 29, 2024, from U.S. Appl. No. 18/400,662, 15 pp.
Office Action dated Sep. 24, 2024, from U.S. Appl. No. 18/583,462, 19 pp.
Office Action dated Sep. 24, 2024, from U.S. Appl. No. 18/583,523, 22 pp.
Office Action dated Sep. 30, 2024, from U.S. Appl. No. 18/583,487, 15 pp.
Summons to Oral Proceedings pursuant to Rule 115(1) EPC dated Jul. 11, 2024, from European Patent Application No. 18187252.4, 2 pp.
Notice of Allowance dated Feb. 26, 2025, from U.S. Appl. No. 18/400,662, 8 pp.
Notice of Allowance dated Feb. 27, 2025, from U.S. Appl. No. 18/583,462, 8 pp.
Notice of Allowance dated Mar. 5, 2025, from U.S. Appl. No. 18/583,523, 8 pp.
Notice of Allowance dated Mar. 12, 2025, from U.S. Appl. No. 18/583,487, 8 pp.

* cited by examiner

```
QP_FRAME_UNIFORM (1 bit)
QP_CHANNEL_UNIFORM (1 bit)
If (QP_CHANNEL_UNIFORM == 1) {
   QP_FRAME (N bits)   //Quantization parameter for all channels.
}
Else {
   QP_FRAME_Y (N bits)  //Quantization parameter for Y channel.
   QP_FRAME_U (N bits)  //Quantization parameter for U channel.
   QP_FRAME_V (N bits)  //Quantization parameter for V channel.
}
```

Figure 11

```
If (IS_LEFT_NEIGHBOR && IS_TOP_NEIGHBOR && QP_LEFT == QP_TOP) {
   QP_PRED = QP_LEFT
}
Else {
   QP_PRED = QP_FRAME
}
```

Figure 12

```
If (QP_FRAME_UNIFORM == 0) {
  If (QP_CHANNEL_UNIFORM)
    NUM_BITS_QP_MB (3 bits)
  Else {
    NUM_BITS_QP_MB_Y (3 bits)
    NUM_BITS_QP_MB_U (3 bits)
    NUM_BITS_QP_MB_V (3 bits)
  }
}
```

Figure 13

```
If (QP_FRAME_UNIFORM == 0) {
  QP_SKIP (1 bit)
  If (QP_SKIP == 0) {
    If (QP_CHANNEL_UNIFORM)
      DIFF_QP_MB (NUM_BITS_QP_MB bits)    //QP for all channels for this MB.
    Else {
      DIFF_QP_MB_Y (NUM_BITS_QP_MB_Y bits)  //QP for Y channel for this MB.
      DIFF_QP_MB_U (NUM_BITS_QP_MB_U bits)  //QP for U channel for this MB.
      DIFF_QP_MB_V (NUM_BITS_QP_MB_V bits)  //QP for V channel for this MB.
    }
  }
}
```

Figure 14

```
If (QP_FRAME_UNIFORM == 0) {
  If (QP_CHANNEL_UNIFORM) {
    NUM_QP_INDEX (3 bits)
    NUM_QP = NUM_QP_INDEX + 2
    QP_MB_TABLE[0] = QP_FRAME
    for (i = 1; i < NUM_QP; i++) {
      QP_INDEX_MB(8 bits)
      QP_MB_TABLE[i] = QP_INDEX_MB
    }
  }
  Else {
    NUM_QP_INDEX_Y (3 bits)
    NUM_QP_INDEX_U (3 bits)
    NUM_QP_INDEX_V (3 bits)
    NUM_QP_Y = NUM_QP_INDEX_Y + 2
    QP_MB_Y[0] = QP_FRAME_Y
    for (i = 1; i < NUM_QP_Y; i++) {
      QP_INDEX_MB_Y(8 bits)
      QP_MB_TABLE_Y[i] = QP_INDEX_MB_Y
    }
    NUM_QP_U = NUM_QP_INDEX_U + 2
    QP_MB_U[0] = QP_FRAME_U
    for (i = 1; i < NUM_QP_U; i++) {
      QP_INDEX_MB_U(8 bits)
      QP_MB_TABLE_U[i] = QP_INDEX_MB_U
    }
    NUM_QP_V = NUM_QP_INDEX_V + 2
    QP_MB_V[0] = QP_FRAME_V
    for (i = 1; i < NUM_QP_V; i++) {
      QP_INDEX_MB_V(8)
      QP_MB_TABLE_V[i] = QP_INDEX_MB_V
    }
  }
}
```

Figure 15

```
QP_SKIP (1 bit)
If (QP_SKIP != 1) {
  If (QP_CHANNEL_UNIFORM) {
    NUM_QP_EFFECTIVE = NUM_QP - 1
    QP_ID = 0
    If (NUM_QP_EFFECTIVE > 1)
       QP_ID (x bits)  //vlc coded using table of size NUM_QP_EFFECTIVE
    QP_PRED_ID = ID_of(QP_PRED)
    If (QP_ID >= QP_PRED_ID)
       QP_ID++;
    QP_MB = QP_MB_TABLE[QP_ID]
  }
  else {   // QP_CHANNEL_UNIFORM == 0
    NUM_QP_EFFECTIVE = NUM_QP_Y - 1
    QP_ID = 0
    If (NUM_QP_EFFECTIVE > 1)
       QP_ID (x bits)  //vlc coded using table of size NUM_QP_EFFECTIVE for Y
    QP_PRED_Y_ID = ID_of(QP_PRED_Y)
    If (QP_ID >= QP_PRED_Y_ID)
       QP_ID++;
    QP_MB_Y = QP_MB_TABLE_Y[QP_ID]
    NUM_QP_EFFECTIVE = NUM_QP_U - 1
    QP_ID = 0
    If (NUM_QP_EFFECTIVE > 1)
       QP_ID (x bits)  //vlc coded using table of size NUM_QP_EFFECTIVE for U
    QP_PRED_U_ID = ID_of(QP_PRED_U)
    If (QP_ID >= QP_PRED_U_ID)
       QP_ID++;
    QP_MB_U = QP_MB_TABLE_U[QP_ID]
    NUM_QP_EFFECTIVE = NUM_QP_V
    QP_ID = 0
    If (NUM_QP_EFFECTIVE > 1)
       QP_ID (x bits)  //vlc coded using table of size NUM_QP_EFFECTIVE for V
    QP_PRED_V_ID = ID_of(QP_PRED_V)
    If (QP_ID >= QP_PRED_V_ID)
       QP_ID++;
    QP_MB_V = QP_MB_TABLE_V[QP_ID]
  }
}
```

| QP_ID | VLC |
|---|---|
| 0 | 0 |
| 1 | 1 |

| QP_ID | VLC |
|---|---|
| 0 | 0 |
| 1 | 10 |
| 2 | 11 |

| QP_ID | VLC |
|---|---|
| 0 | 0 |
| 1 | 10 |
| 2 | 110 |
| 3 | 111 |

| QP_ID | VLC |
|---|---|
| 0 | 0 |
| 1 | 10 |
| 2 | 110 |
| 3 | 1110 |
| 4 | 1111 |

| QP_ID | VLC |
|---|---|
| 0 | 0 |
| 1 | 10 |
| 2 | 110 |
| 3 | 1110 |
| 4 | 11110 |
| 5 | 11111 |

| QP_ID | VLC |
|---|---|
| 0 | 0 |
| 1 | 10 |
| 2 | 110 |
| 3 | 1110 |
| 4 | 11110 |
| 5 | 111110 |
| 6 | 111111 |

Figure 17F

PREDICTING A QUANTIZATION PARAMETER FOR A CURRENT UNIT USING QUANTIZATION PARAMETERS OF SPATIALLY NEIGHBORING UNITS

CROSS-REFERENCE TO RELATED APPLICATIONS

This application is a continuation of U.S. patent application Ser. No. 17/981,132, filed Nov. 4, 2022, which is a continuation of U.S. patent application Ser. No. 17/404,832, filed Aug. 17, 2021, now U.S. Pat. No. 11,528,481, which is a continuation of U.S. patent application Ser. No. 16/384,704, filed Apr. 15, 2019, now U.S. Pat. No. 11,122,268, which is a continuation of U.S. patent application Ser. No. 15/391,609, filed Dec. 27, 2016, now U.S. Pat. No. 10,306,227, which is a continuation of U.S. patent application Ser. No. 14/307,282, filed Jun. 17, 2014, now U.S. Pat. No. 9,571,840, which is a continuation of U.S. patent application Ser. No. 12/156,864, filed Jun. 3, 2008, now U.S. Pat. No. 8,897,359, the disclosure of which is hereby incorporated by reference.

BACKGROUND

Engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system.

Generally, much of the bit rate reduction from compression is achieved through quantization. According to one possible definition, quantization is a term used for an approximating non-reversible mapping function commonly used for lossy compression, in which there is a specified set of possible output values, and each member of the set of possible output values has an associated set of input values that result in the selection of that particular output value. A variety of quantization techniques have been developed, including scalar or vector, uniform or non-uniform, with or without dead zone, and adaptive or non-adaptive quantization.

In many implementations, an encoder performs quantization essentially as a biased division of an original data value by a quantization factor. One or more quantization parameters (QPs) indicate the quantization factor for purposes of inverse quantization of the data value. For inverse quantization, often implemented as a multiplication operation, an encoder or decoder reconstructs a version of the data value using the quantization factor indicated by the QP(s). Quantization typically introduces loss in fidelity to the original data value, which can show up as compression errors or artifacts in the results of decoding.

Most scalable video codecs split video into a base layer and an enhancement layer. The base layer alone provides a reconstruction of the video at a lower quality level and/or a lower resolution, and the enhancement layer can be added to provide extra information that will increase the video quality. Many single-layer digital video coding standards today allow for QPs to vary spatially in the base layer. This feature allows encoding to adapt to the macroblock characteristics and thus achieve better perceptual quality for a given rate.

While the above described techniques provide acceptable performance in some instances of scalable video coding, none of them provide the advantages and benefits of the techniques and tools described below.

SUMMARY

In summary, the detailed description presents techniques and tools for scalable encoding and decoding of enhancement layer video using a spatially variable quantization. The quantization may be variable for an entire picture of the enhancement layer video or separately variable for each color channel in the enhancement layer video for the picture. The techniques and tools improve the performance of a general-purpose video encoder when it encodes an enhancement layer of video pictures.

In some embodiments, a tool such as an encoder encodes enhancement layer video for a picture organized in multiple color channels (e.g., a luma ("Y") channel and two chroma ("U" and "V") channels). The tool selectively varies quantization spatially over the frame, and in some cases the tool selectively varies quantization spatially and also varies quantization between the multiple color channels of the enhancement layer video for the picture. The tool outputs encoded enhancement layer video for the picture in a bitstream, signaling QP information. The QP information indicates QPs that at least in part parameterize the varied quantization of the enhancement layer video for the picture.

For corresponding decoding, a tool such as a decoder decodes enhancement layer video for a picture organized in multiple color channels. The tool receives encoded enhancement layer video for the picture in a bitstream, receiving QP information indicating QPs that at least in part parameterize varied quantization of the enhancement layer video for the picture. During inverse quantization, the tool accounts for quantization that varies spatially over the frame and between the multiple color channels of the enhancement layer video for the picture.

In other embodiments, a tool such as a video decoder receives encoded information for video for a picture from a bitstream. The encoded information includes QP selection information for a current unit of the video for the picture. When the tool decodes the current unit, the tool predicts a QP for the current unit using one or more QPs for spatially neighboring units of the video for the picture. The tool then selects between the predicted QP and another QP using the QP selection information, and uses the selected QP in reconstruction of the current unit. In some implementations, the tool decodes different information for predicted QPs for each color channel.

For corresponding encoding, a tool such as an encoder signals encoded information for video for a picture from a bitstream. The encoded information includes QP selection information for a current unit of the video for the picture. When the tool encodes the current unit, after determining a QP for the current unit, the tool encodes the QP selection information. The tool predicts a QP for the current unit using one or more QPs for spatially neighboring units of the video for the picture. If the predicted QP is the actual QP for the current unit, the QP selection information so indicates. Otherwise, the QP selection information indicates another QP for the current unit.

The foregoing and other objects, features, and advantages will become more apparent from the following detailed description, which proceeds with reference to the accompanying figures. This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

FIG. 11 is a pseudocode listing illustrating bitstream syntax for signaling/receiving information that indicates frame QP and channel QPs in first and second example combined implementations.

FIG. 12 is a pseudocode listing illustrating an example QP prediction rule in the first and second example combined implementations.

FIG. 13 is a pseudocode listing illustrating bitstream syntax for signaling/receiving information that indicates number of bits used for macroblock-level differential QP information in the first example combined implementation.

FIG. 14 is a pseudocode listing illustrating bitstream syntax for signaling/receiving QP selection information in the first example combined implementation.

FIG. 15 is pseudocode listing illustrating bitstream syntax for signaling/receiving information that indicates how to populate a table of QP values in the second example combined implementation.

FIG. 16 is a pseudocode listing illustrating bitstream syntax for signaling/receiving QP selection information in the second example combined implementation.

FIGS. 17A-F are VLC tables used for QP selection information in the second example combined implementation.

DETAILED DESCRIPTION

Figure 1:
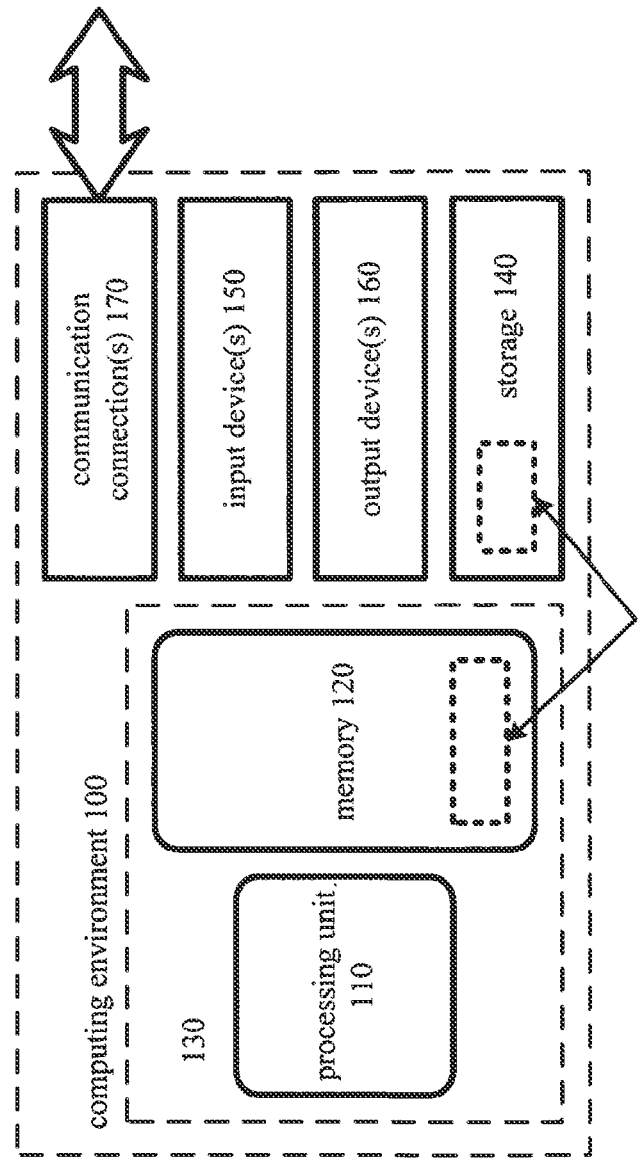
FIG. 1 is a block diagram of a suitable computing environment in which several described embodiments may be implemented.

Techniques and tools for adapting quantization spatially and from color channel-to-channel are described herein.

Depending on implementation, adapting quantization spatially and across color channels of enhancement layer video can help improve scalable video coding performance in several respects, especially for high-fidelity encoding of high bit depth video.

Many base layer video encoders adapt quantization spatially. When enhancement layer video represents quality differences between reconstructed base layer video and the original video, the energy of the signal in the enhancement layer can vary roughly in proportion to the strength of adaptive quantization in the base layer. Adapting quantization of the enhancement layer video spatially helps improve encoding performance for the enhancement layer video.

Spatially adapting quantization of enhancement layer video can have other advantages. In some scalable video encoding/decoding systems, certain areas of enhancement layer video are predicted from base layer video, while other areas of the enhancement layer video are predicted from previously reconstructed enhancement layer video, for example, using motion compensation. Using different levels of quantization in the different areas of the enhancement layer video can improve performance by allowing the encoder to adapt to the characteristics of the different areas.

Adapting quantization between color channels of enhancement layer video can also improve performance. Different video formats can use samples in different color spaces such as RGB, YUV and YCbCr. For YUV or YCbCr, Y represents the brightness (luma) channel of video, and U and V, or Cb and Cr, represent the color (chroma) channels of the video. The human eye is, in general, more sensitive to variations in brightness than color, so encoders have been developed to take advantage of this fact by reducing the resolution of the chroma channels relative to the luma channel. In the YUV color space, one chroma sampling rate is 4:4:4 which indicates that for every luma sample, a corresponding U sample and a V sample are present. Another chroma sampling rate is 4:2:2, which indicates that a single U sample and a single V sample correspond to two horizontal luma samples. Chroma sampling rates at lower resolution, such as 4:2:2 or 4:2:0, result in fewer chroma samples and typically require fewer bits to encode than higher resolution chroma sample rates, such as 4:4:4. Aside from different resolutions in different channels due to chroma sampling, each color channel in the video may be quantized to a different level of fidelity in the base layer video.

Some scalable video encoders encode base-layer video a low chroma sampling rate (e.g., 4:2:0) and/or fidelity, and encode enhancement-layer video at a higher chroma sampling rate (e.g., 4:2:2 or 4:4:4). The chroma channels of the enhancement layer video may thus have different signal energies than the luma channel. Using different levels of quantization in the different channels of the enhancement layer video can improve performance by allowing the encoder to adapt to the characteristics of the channels.

In some implementations, part or all of enhancement layer video can be remapped to a lower chroma resolution for encoding/decoding with a base layer video encoder/decoder. Adapting quantization between channels can help in this situation too. For example, if the base layer video is a tone-mapped version of the enhancement layer video, using different QPs for the luma channel, as compared to the chroma channels, can improve performance.

Techniques and tools for efficiently encoding and signaling QP values are also described herein. For example, one method of encoding and signaling QP values for enhancement layer video includes using QP prediction to exploit inter-unit, spatial redundancy in QP values. In many scenarios, this helps reduce the cost of signaling QPs for units of a picture or a color channel of the picture, where a unit is a block, macroblock, segment, or some other type of unit. Spatial QP prediction can be used in conjunction with a simple mechanism to signal whether or not quantization varies spatially over picture, or across the color channels in the picture.

Some of the techniques and tools described herein address one or more of the problems noted in the background. Typically, a given technique/tool does not solve all such problems. Rather, in view of constraints and tradeoffs in encoding time, encoding resources, decoding time, decoding resources and/or quality, the given technique/tool improves encoding and/or performance for a particular implementation or scenario.

I. Computing Environment

FIG. 1 illustrates a generalized example of a suitable computing environment (100) in which several of the described embodiments may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing an encoder with one or more of the described techniques and tools for enhancement layer video coding and/or decoding using QPs that vary spatially and/or across the color channels of a picture.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180) implementing the video encoder and/or decoder.

The input device(s) (150) may be a touch input device such as a keyboard, mouse, pen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM or CD-RW that reads audio or video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "produce" and "encode" to describe computer operations in a computing environment. These terms are high-level abstractions for operations performed by a computer, and should not be confused with acts performed by a human being. The actual computer operations corresponding to these terms vary depending on implementation.

II. Exemplary Encoding Tool

Figure 2:
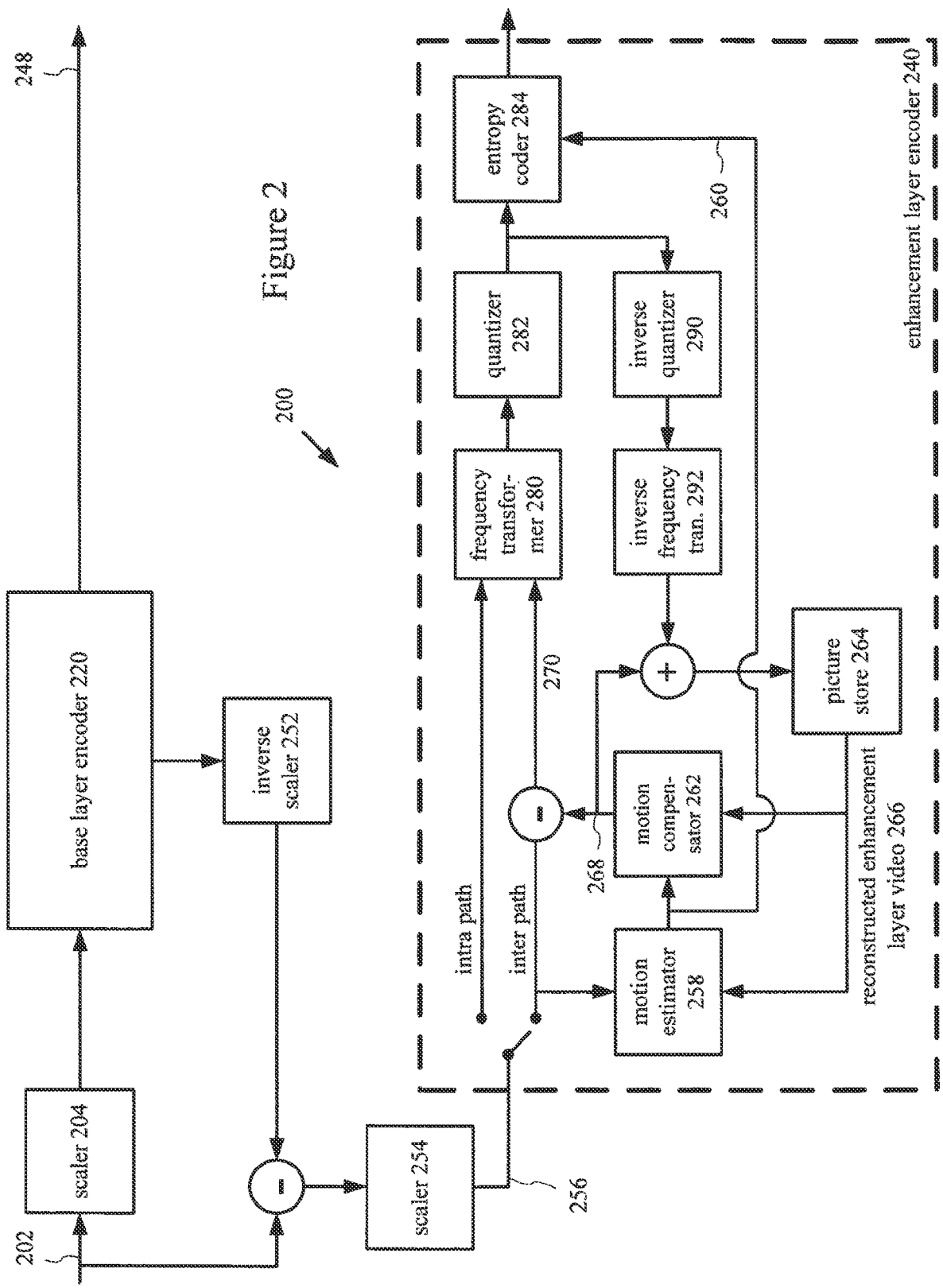
FIG. 2 is a block diagram of an exemplary encoding system for encoding a picture of enhancement layer video quantized with one or more QPs that vary spatially and/or across color channels of the picture.

FIG. 2 is a block diagram of an encoding tool (200) for encoding input video as a base layer and an enhancement layer in conjunction with which some described embodiments may be implemented. For the base layer, the format of the base layer bit stream (248) can be a Windows Media Video or VC-1 format, MPEG-x format (e.g., MPEG-1, MPEG-2, or MPEG-4), H.26x format (e.g., H.261, H.262, H.263, or H.264), or other format.

The tool (200) processes video pictures. The term "picture" generally refers to source, coded, or reconstructed image data. For progressive video, a picture is a progressive video frame. For interlaced video, a picture may refer to an interlaced video frame, the top field of the frame, or the bottom field of the frame, depending on context. The generic term "picture" will be used to represent these various options.

The encoding tool includes a first scaler (204) which accepts input video pictures (202) and outputs base layer video to a base layer encoder (220). The first scaler (204) may downsample or otherwise scale the input video pictures (202), for example, to reduce sample depth, spatial resolution or chroma sampling resolution. Or, in some instances, the first scaler upsamples the input video pictures (202) or does not alter the input video pictures (202) at all.

The base layer encoder (220) encodes the base layer video and outputs a base layer bit stream (248), and additionally makes available reconstructed base layer video which is input to an inverse scaler (252). If the reconstructed base layer video has a different bit depth, spatial resolution, chroma sampling rate, etc. than the input video pictures (202) due to scaling, then the inverse scaler (252) may upsample (or otherwise inverse scale) the reconstructed base layer video so that it has the same resolution as the input video pictures (202).

The input video pictures (202) are compared against the reconstructed base layer video to produce enhancement layer video that is input to a second scaler (254). The second scaler (254) may or may not be the same physical component or software program as the first scaler (204). The second scaler (254) outputs the enhancement layer video (256) to an enhancement layer encoder (240).

Figure 3:
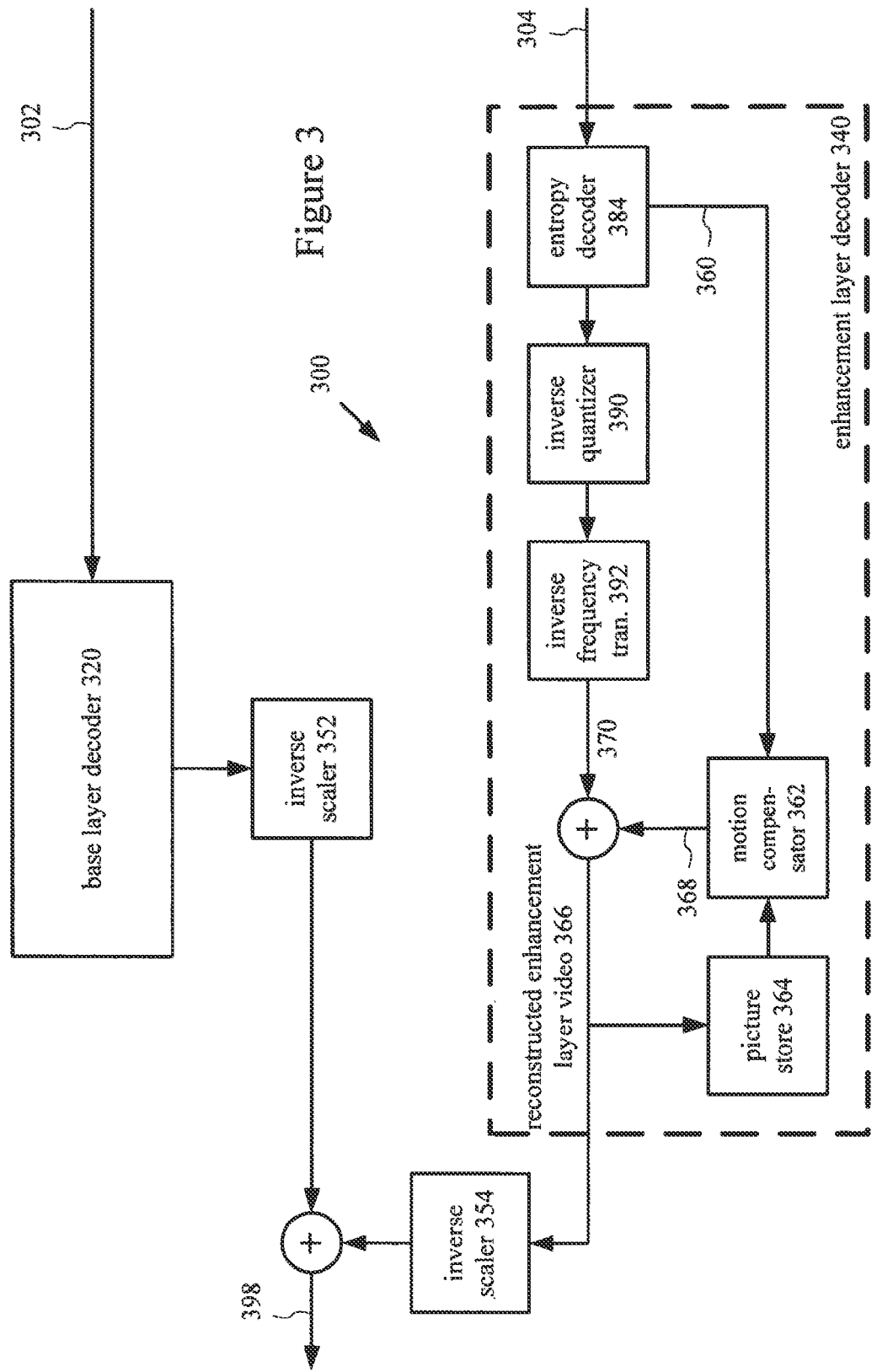
FIG. 3 is a block diagram of an exemplary decoding system for decoding a picture of enhancement layer video quantized with one or more QPs that vary spatially and/or across color channels of the picture.

The enhancement layer encoder (240) compresses inter-coded, predicted "pictures" (256) of the enhancement layer video and intra-coded "pictures" (256) of the enhancement layer video. The "picture" at a given time in the enhancement layer video represents differences between an input video picture and a reconstructed base layer video picture, but is still encoded as a picture by the example encoder (240). For the sake of presentation, FIG. 3 shows a path for intra-coded content through the enhancement layer encoder (240) and a path for inter-coded predicted content. Many of the components of the enhancement layer encoder (240) are used for compressing both intra-coded content and inter-coded, predicted content. The exact operations performed by those components can vary depending on the type of information being compressed. Although FIG. 2 shows a single enhancement layer encoder (240), the enhancement layer video (256) can itself be separated into multiple layers of residual video for encoding with separate residual encoders. Generally, the enhancement layer video (256) that is encoded represents differences (but not necessarily all differences) between the reconstructed base layer video and the input video.

In general, within the encoder (240), inter-coded, predicted content (as a picture) is represented in terms of prediction from previously reconstructed content (as one or more other pictures, which are typically referred to as reference pictures or anchors). For example, content at a given time is encoded as a progressive P-frame or B-frame, interlaced P-field or B-field, or interlaced P-frame or B-frame. Within the encoder (240), a prediction residual is the difference between predicted information and corresponding original enhancement layer video.

If the enhancement layer video (256) content is encoded as a predicted picture, a motion estimator (258) estimates motion of macroblocks or other sets of samples of the enhancement layer video picture with respect to one or more reference pictures, which represent previously reconstructed enhancement layer video content. The picture store (264) buffers reconstructed enhancement layer video (266) as a reference picture. When multiple reference pictures are used, the multiple reference pictures can be from different temporal directions or the same temporal direction. The motion estimator (258) outputs motion information (260) such as motion vector information.

The motion compensator (262) applies motion vectors to the reconstructed enhancement layer video content (266) (stored as reference picture(s)) when forming a motion-compensated current picture (268). The difference (if any) between a block of the motion-compensated enhancement layer video (268) and corresponding block of the original enhancement layer video (256) is the prediction residual (270) for the block. During later reconstruction of the enhancement layer video, reconstructed prediction residuals are added to the motion compensated enhancement layer video (268) to obtain reconstructed content closer to the original enhancement layer video (256). In lossy compression, however, some information is still lost from the original enhancement layer video (256). Alternatively, a motion estimator and motion compensator apply another type of motion estimation/compensation.

A frequency transformer (280) converts spatial domain video information into frequency domain (i.e., spectral, transform) data. For block-based video content, the frequency transformer (280) applies a DCT, variant of DCT, or other forward block transform to blocks of the samples or prediction residual data, producing blocks of frequency transform coefficients. Alternatively, the frequency transformer (280) applies another conventional frequency transform such as a Fourier transform or uses wavelet or sub-band analysis. The frequency transformer (280) may apply an 8×8, 8×4, 4×8, 4×4 or other size frequency transform.

A quantizer (282) then quantizes the blocks of transform coefficients. The quantizer (282) applies non-uniform, scalar quantization to the spectral data with a step size that varies spatially on a picture-by-picture basis, macroblock-by-macroblock basis or other basis. Additionally, in some cases the quantizer varies quantization across color channels of the enhancement layer video picture. The quantizer (282) can also apply another type of quantization, for example, a uniform or adaptive quantization for at least some spectral data coefficients, or directly quantizes spatial domain data in an encoder system that does not use frequency transformations.

When a reconstructed enhancement layer video picture is needed for subsequent motion estimation/compensation, an inverse quantizer (290) performs inverse quantization on the quantized spectral data coefficients. An inverse frequency transformer (292) performs an inverse frequency transform, producing blocks of reconstructed prediction residuals (for predicted enhancement layer video content) or samples (for intra-coded residual video content). If the enhancement layer video (256) was motion-compensation predicted, the reconstructed prediction residuals are added to the motion-compensated predictors (268) to form the reconstructed enhancement layer video. The picture store (264) buffers the reconstructed enhancement layer video for use in subsequent motion-compensated prediction.

The entropy coder (284) compresses the output of the quantizer (282) as well as certain side information (e.g., quantization parameter values) Typical entropy coding techniques include arithmetic coding, differential coding, Huffman coding, run length coding, LZ coding, dictionary coding, and combinations of the above. The entropy coder (284) typically uses different coding techniques for different kinds of information, and can choose from among multiple code tables within a particular coding technique.

A controller (not shown) receives inputs from various modules such as the motion estimator (258), frequency transformer (280), quantizer (282), inverse quantizer (290), and entropy coder (284). The controller evaluates intermediate results during encoding, for example, setting quantization step sizes and performing rate-distortion analysis. The controller works with modules such as the motion estimator (258), frequency transformer (280), quantizer (282), and entropy coder (284) to set and change coding parameters during encoding. When an encoder evaluates different coding parameter choices during encoding, the encoder may iteratively perform certain stages (e.g., quantization and inverse quantization) to evaluate different parameter settings. The encoder may set parameters at one stage before proceeding to the next stage. Or, the encoder may jointly evaluate different coding parameters. The tree of coding parameter decisions to be evaluated, and the timing of corresponding encoding, depends on implementation. In some embodiments, the controller also receives input from an encoding session wizard interface, from another encoder application interface, or from another source to designate video as having specific content to be encoded using specific rules.

The above description explicitly addresses motion compensation for enhancement layer video. The encoder (240) additionally performs intra-compression of the enhancement layer video. In that instance, the scaler (254) provides enhancement layer video (256) to the encoder (240) and the encoder intra-compresses it as an intra-coded picture, without motion compensation. Instead, the enhancement layer video (256) is provided directly to the frequency transformer (280), quantizer (282), and entropy coder (284) and output as encoded video. A reconstructed version of the intra-coded enhancement layer video can be buffered for use in subsequent motion compensation of other enhancement layer video.

The relationships shown between modules within the encoder (240) indicate general flows of information in the encoder; other relationships are not shown for the sake of simplicity. In particular, FIG. 2 generally does not show side information indicating modes, tables, etc. used for a video sequence, picture, macroblock, block, etc. Such side information, once finalized, is sent in the output bit stream, typically after entropy encoding of the side information.

Particular embodiments of video encoders typically use a variation or supplemented version of the enhancement layer encoder (240). Depending on implementation and the type of compression desired, modules of the encoder can be added, omitted, split into multiple modules, combined with other modules, and/or replaced with like modules. For example, the controller can be split into multiple controller modules associated with different modules of the encoder. In alternative embodiments, encoders with different modules and/or other configurations of modules perform one or more of the described techniques.

III. Exemplary Decoding Tool

FIG. 3 is a block diagram of a decoding system (300), including an exemplary enhancement layer decoder (340), in conjunction with which some described embodiments may be implemented. The system (300) includes a base layer decoder (320) which receives a base layer bit stream (302) and outputs reconstructed base layer video to a first inverse scaler (352). The base layer bit stream (302) can be a bit stream in a Windows Media Video or VC-1 format, MPEG-x format (e.g., MPEG-1, MPEG-2, or MPEG-4), H.26× format (e.g., H.261, H.262, H.263, or H.264), or other format. In certain embodiments, the base layer bit stream (302) is encoded using motion compensation, and thus the base layer decoder (320) includes a motion compensation loop. The first inverse scaler (352) is operable to upsample or otherwise inverse scale the reconstructed base layer video to the desired bit depth, spatial resolution, chroma sampling rate and/or other resolution of the output reconstructed video pictures (398).

The system further includes an enhancement layer decoder (340) operable to receive an enhancement layer bit stream (304). The enhancement layer bit stream (304) can be the same format as the base layer bit stream (302), or it may be a different format. The entropy decoder (384) is operable to decode elements of the bit stream that were encoded by entropy encoding methods including arithmetic coding, differential coding, Huffman coding, run length coding, LZ coding, dictionary coding, and combinations of the above. The entropy decoder (384) typically uses different decoding techniques for different kinds of information, and can choose from among multiple code tables within a particular decoding technique. The entropy decoder (384) outputs side information such as motion vector information (360) to a motion compensator (362).

An inverse quantizer (390) applies inverse quantization to some of the output of the entropy decoder (384). In certain embodiments, the inverse quantizer (390) is operable to reverse non-uniform scalar quantization with a step size that varies on a picture-by-picture basis, macroblock-by-macroblock basis, color channel-by-color channel basis, or some other basis. More generally, the inverse quantizer (390) is operable to reverse quantization applied during encoding.

An inverse frequency transformer (392) accepts the output of the inverse quantizer (390). The inverse frequency transformer (392) is operable to produce blocks of spatial domain values by applying an inverse DCT, variant of inverse DCT, or other reverse block transform to the output of the inverse quantizer (390). The inverse frequency transformer (392) may be operable to reverse an 8×8, 8×4, 4×8, 4×4 or some other size frequency transform. The inverse frequency transformer (392) outputs reconstructed values (370) for a prediction residual (in the case of inter-coded enhancement layer video content) or samples (in the case of intra-coded enhancement layer video content).

The motion vector information (360) output from the entropy decoder (384) is input to a motion compensator (362). The motion compensator (362) applies the motion vector information to previously reconstructed enhancement layer video buffered in a picture store (364) and outputs motion-compensation-predicted enhancement layer video (368).

In decoding of inter-coded enhancement layer video, the motion-compensation-predicted enhancement layer video (368) is combined with the prediction residuals (370) to form reconstructed enhancement layer video (366). The reconstructed enhancement layer video (366) is buffered by the picture store (364) (for use in subsequent motion compensation) and output from the enhancement layer decoder (340) to a second inverse scaler (354).

The enhancement layer decoder (340) may be operable to decode 8-bit video, 10-bit video, or video with some other bit depth. If the enhancement layer decoder (340) decodes 8-bit video and output video with a higher bit depth (e.g., 10-bit) is to be reconstructed, then the second inverse scaler (354) upsamples the reconstructed enhancement layer video (366) to the higher bit depth. Or, if the enhancement layer decoder (340) decodes 16-bit video and output video with a lower bit depth (e.g., 8-bit) is to be reconstructed, then the second inverse scaler (354) downsamples the reconstructed enhancement layer video (366) to the lower bit depth. The decoding tool combines the inverse scaled, reconstructed enhancement layer video output from the second inverse scaler (354) with the inverse scaled, reconstructed base layer video output by the first inverse scaler (352), to produce reconstructed video pictures (398) for the output video.

The above description explicitly addresses decoding of inter-coded enhancement layer video. The decoder (340), using intra-decoding, also decodes intra-coded enhancement layer video. In that instance, the entropy decoder (384), inverse quantizer (390), and inverse frequency transformer (392) act as previously mentioned to produce samples of the enhancement layer video, bypassing motion compensation. The reconstructed enhancement layer video (366) is buffered in a picture store (364) for use in future motion compensation.

The relationships shown between modules within the decoder (340) indicate general flows of information in the decoder; other relationships are not shown for the sake of simplicity. In particular, FIG. 3 generally does not show side information indicating modes, tables, etc. used for a video sequence, picture, macroblock, block, etc.

Particular embodiments of video decoders typically use a variation or supplemented version of the generalized decoder (340). Depending on implementation and the type of compression desired, modules of the decoder can be added, omitted, split into multiple modules, combined with other modules, and/or replaced with like modules. In alternative embodiments, decoders with different modules and/or other configurations of modules perform one or more of the described techniques.

Although FIG. 3 shows a single enhancement layer decoder (340), the enhancement layer video can itself be separated into multiple layers of residual video for encoding with separate residual encoders and signaling as multiple enhancement layer bit streams. A given decoding system includes one or more separate residual decoders for decoding one or more of the multiple enhancement layer bit streams. Generally, the enhancement layer video that is decoded represents differences (but not necessarily all differences) between the reconstructed base layer video and the original input video.

IV. Varying Quantization Spatially and Across Channels

According to a first set of techniques and tools, an encoder varies quantization of enhancement layer video spatially and/or across color channels of a picture. For example, the encoder varies quantization from unit-to-unit for multiple units (such as macroblocks) of enhancement layer video, potentially using different quantization in different color channels for the units. The encoder signals quantization parameters that parameterize the variable quantization. A corresponding decoder varies inverse quantization of the enhancement layer video spatially and/or across color channels of a picture.

A. Generalized Encoding Technique.

Figure 4:
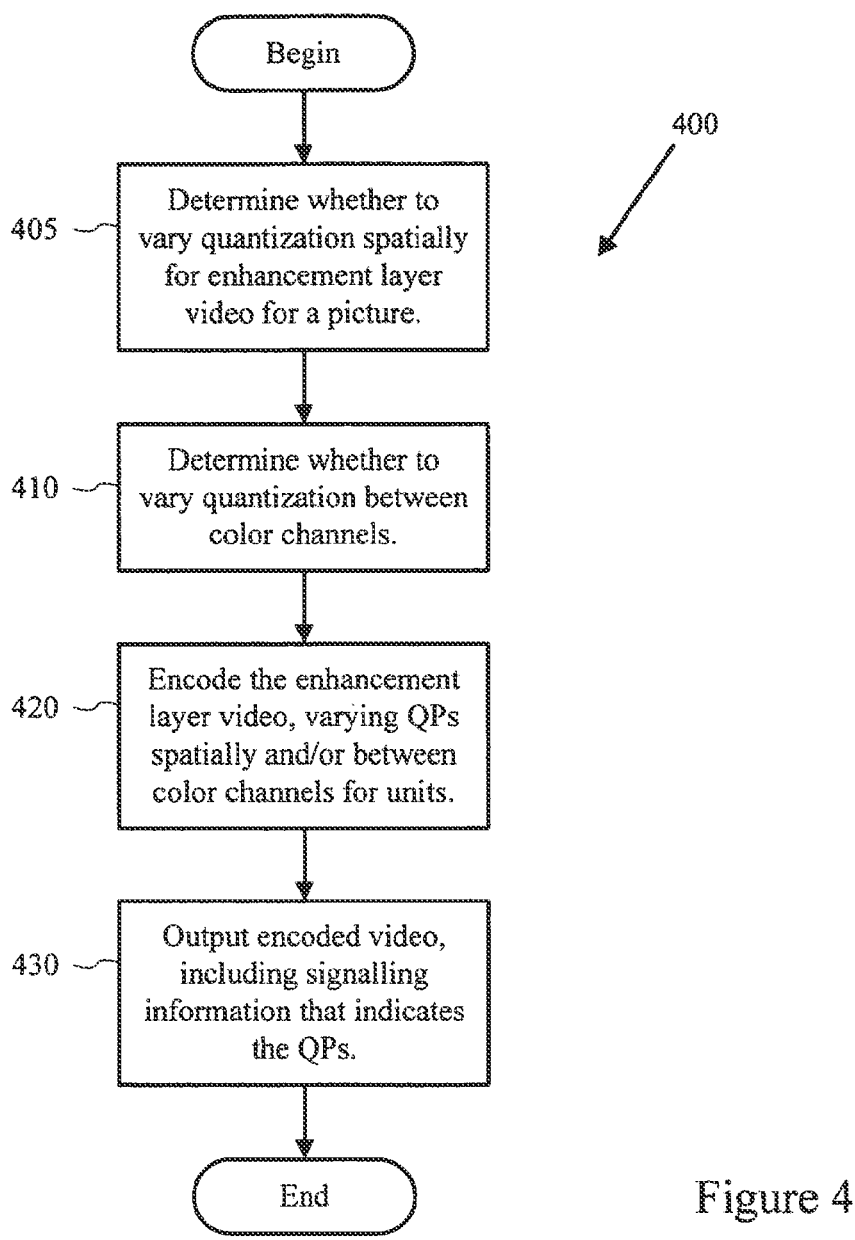
FIG. 4 is a flow chart of a generalized technique for encoding enhancement layer video quantized with one or more QPs that vary spatially and/or across color channels of a picture.

FIG. 4 shows a flow chart for a generalized technique (400) for encoding an enhancement layer video with quantization that varies spatially across a picture and/or across color channels of the picture. An encoding tool (200), such as that described with reference to FIG. 2 performs the technique (400), or some other tool may be used.

The encoding tool determines (405) whether to vary quantization spatially for a picture of enhancement layer video. This may be indicated by user input or through analysis of the picture or portions of the picture. For example, if a user desires a high degree of rate-distortion efficiency in compression, the user may direct the tool to use spatially varying QPs. Alternatively, if the picture being encoded has a high degree of complexity or spatial variance above a threshold value, then a pre-set threshold in software directs the tool to use spatially varying QPs when encoding the picture.

The tool also determines (410) whether to vary quantization between the plural color channels of the picture of enhancement layer video. The pictures can be images of various color formats (e.g., YUV or YCbCr for color space, with 4:4:4, 4:2:2 or 4:2:0 chroma sampling rate). If it is a YUV or YCbCr image, the image has a luma channel and two chroma channels. The separate channels (also called color planes or components) of the image can have different spatial resolutions. The tool may vary the QP across different color channels of the picture according to a user indication, encoder wizard setting, or through analysis of a picture, a portion of the picture, and/or one or more of the color channels.

Next, the tool encodes (420) the picture of enhancement layer video using determined QP or QPs. The tool determines one or more QPs for the picture. If the picture's QPs do not vary spatially over the picture, then only a single QP is used for the picture. If the picture's QPs do vary spatially, then a different QP is determined for each unit (e.g., macroblock, block) in the picture. Additionally, if QPs vary across the color channels of the picture, then the tool determines multiple QPs for the multiple channels, and potentially determines different QPs for each unit in the picture. For example, a different QP is determined for the luma channel and each of the chroma channels of a unit in the picture. Generally, the encoding tool applies the QP(s) to each of the units in the picture and produces an enhancement layer bit stream.

The tool outputs (430) the encoded enhancement layer bit stream, which includes information indicating the QP or QPs used. Typically, the information indicating the QP or QPs is interspersed in the bit stream with the other parameterized information for the picture or units. For example, the tool signals one or more QPs for each unit in the picture in the enhancement layer bit stream. The signaling can be done in the bit stream at the picture level or the unit level. In some implementations, the tool signals a single bit at the picture level to indicate whether QP varies spatially, and if QP varies spatially then the tool signals another bit to indicate whether QP varies across the color channels of the picture. If QP varies spatially over the picture or across the color channels of the picture, the tool signals the value(s) of the QP(s) for each of the units in the picture at the unit level of the bit stream. In this case the tool may additionally signal at the picture level how many bits are used to signal QP information for each unit at the unit level of the bit stream. Alternatively, the tool signals a table comprising different possible QP values, and then signals a selection value from the table for each of the units in the picture at the unit level in the bit stream.

The tool performs the technique (400) for a picture of enhancement layer video and repeats the technique (400) on a picture-by-picture basis. Alternatively, the tool performs the technique for a group of pictures, slice, or other section of video, and repeats the technique on that basis.

B. Exemplary Encoding Technique.

Figure 5:
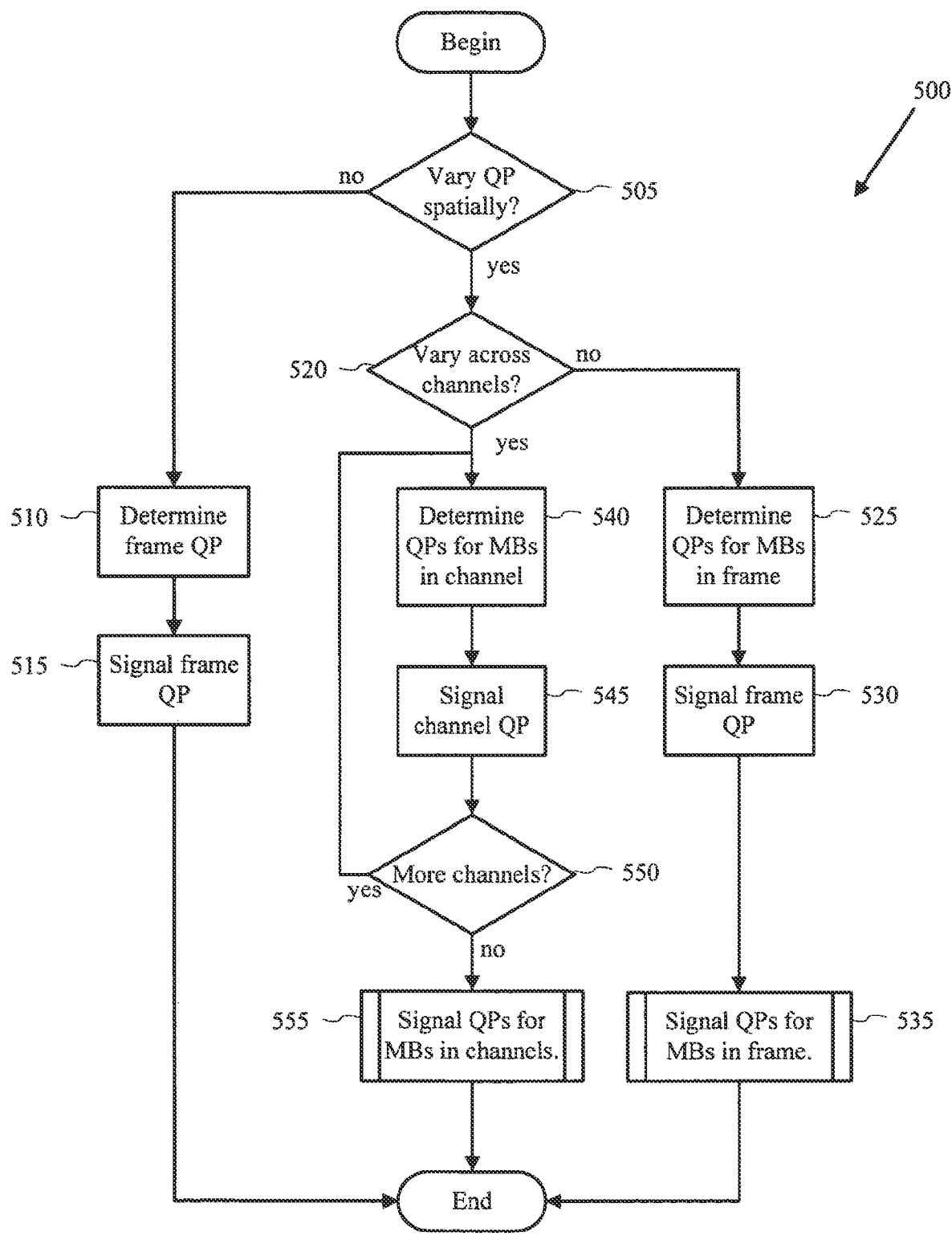
FIG. 5 is a flow chart showing an exemplary technique of determining and signaling the QPs used to encode enhancement layer video quantized with one or more QPs that vary spatially and/or across color channels of a picture.

FIG. 5 shows a flowchart of an exemplary technique (500) of encoding enhancement layer video using QPs that vary spatially or across color channels of an individual frame. An encoding tool (200), such as that described with reference to FIG. 2 is used to perform the technique (500), or some other tool may be used. The tool repeats the technique (500) on a frame-by-frame basis.

The tool first determines (505) whether QP varies spatially for the frame. The tool analyzes the frame to determine whether varying QP would be acceptable or desirable according to one or more of a number of criteria such as desired rate-distortion efficiency, compression speed, degree of complexity of the frame, or other criteria. For example, a user indicates through a user interface such as an encoding wizard that a high degree of rate-distortion efficiency is desired. The tool then determines that a spatially variable QP is necessary to achieve the desired degree of rate-distortion efficiency. Alternatively, the tool determines that the complexity of the frame is above a pre-determined or user-defined threshold and thus determines that a spatially variable QP is desired.

If the tool determines that a spatially variable QP is not desired, the tool determines (510) the frame QP according to criteria such as rate constraints of the compressed file, perceptual quality and/or complexity of the input video. The tool signals (515) the frame QP in the enhancement layer bit stream.

If the tool determines that QP does vary spatially, the tool determines (520) whether QP varies across the color channels of the frame. The tool analyzes each color channel separately or together with the other color channels to determine whether varying QP would be acceptable or desirable for each color channel, according to one or more of a number of criteria such as desired rate-distortion efficiency, compression speed, degree of complexity of the frame, complexity of each channel in the frame, amount of variance within channels and between different channels, or some other criteria.

If the tool determines that QP does not vary across the color channels, the tool determines (525) QPs to use within the frame. For example, the tool determines QPs for macroblocks in the frame according to criteria such as rate constraints, perceptual quality and/or complexity of the video for the respective macroblocks.

After the tool has determined (525) QPs within the frame, the tool signals (530) the frame QP. Generally, the frame QP is the "default" QP used when encoding each macroblock in the frame. In one example, the frame QP is an average of the QPs of the macroblocks in the frame. Alternatively, the tool determines the frame QP as the most common QP in the frame to reduce the bit cost for signaling the QPs for macroblocks. For example, the tool signals that QP varies spatially, that QP does not vary across channels, and that the frame QP is signaled using x bits, and then signals the value of the frame QP itself. Alternatively, the tool may signal that the frame QP is one of a number of entries in a given table (e.g., a QP table for a sequence), or the tool may signal the frame QP in some other manner.

The tool then signals (535) the QPs for the macroblocks in the frame. In one embodiment, this comprises signaling the QP for each of the macroblocks with respect to a predicted QP which can be either a frame QP or a QP that is predicted based on the QPs of one or more other, spatially adjacent macroblocks in the frame. In another embodiment, this comprises signaling the QP for each of the macroblocks as one of a plurality of values in a table.

If the tool determines that QP does vary both spatially and across color channels, then the tool determines (540) QPs to use within a first color channel of the frame. For example, the tool proceeds to determine QPs for macroblocks in the Y color channel according to criteria such as rate constraints, perceptual quality and/or complexity of the video for the respective macroblocks.

After the tool determines (540) the QPs for macroblocks in the channel, the tool signals (545) the frame QP for the channel. Generally, the frame QP for the channel is the "default" QP used when encoding each macroblock in the channel. In one example, the tool determines the frame QP for the channel by averaging the QPs of each of the macroblocks in the channel. In another example, the tool chooses the frame QP for the channel as the most commonly used QP in the channel. In one embodiment, signaling the frame QP for the channel comprises signaling that QP varies both spatially and across the different color channels in the frame, and then signaling the frame QP for the channel itself. Alternatively, the frame QP for the channel may be signaled as one of several values in a QP table (e.g., a QP table for a sequence).

After the tool has signaled the frame QP for the channel, the tool checks (550) whether there are other color channels in the frame that have not been analyzed, for example, the chroma (U, V) channels. If there are, then the tool performs the determining (540) step and the signaling (545) step for the frame QP for each of the other channels. Alternatively, the tool may perform the determining step (540) for the frame QP for each of the channels before the signaling step (545) for any of the channels, or the steps may be performed in some other order.

The tool next signals (555) the QPs for macroblocks for each of the channels. In one embodiment, this comprises signaling the QP for each of the macroblocks in each of the channels with respect to a predicted QP. The predicted QP can be the channel QP, or the predicted QP can be a QP based on the QPs of one or more neighboring macroblocks in the color channel. In another embodiment, the tool signals the QP of each of the macroblocks in each of the channels as one of a plurality of QP values in a table.

In some cases, each of the color channels may not vary spatially, and so the tool indicates with a skip bit that the QPs for the macroblocks in a color channel are all equal to the frame QP for the channel at some point in the encoding process, such as at the signaling step (545) or the signaling step (555).

C. QP Signaling for Macroblocks in Each Color Channel.

Figures 6A, 6B:
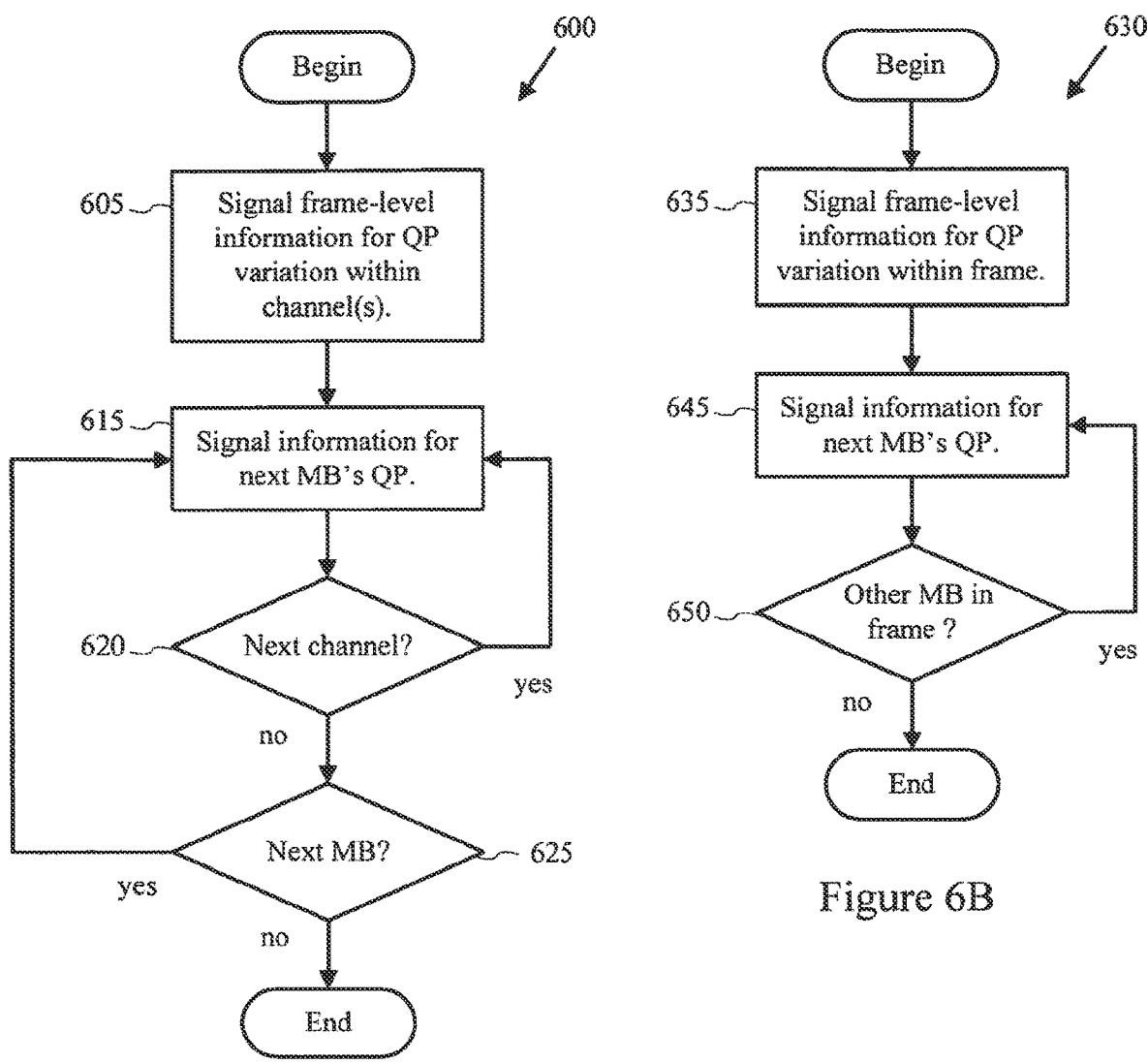
FIGS. 6A and 6B are flow charts showing exemplary techniques of signaling QPs for macroblocks of enhancement layer video for a picture, where the QPs vary spatially and/or across color channels.

FIG. 6A is a flowchart showing details (600) of one approach to signaling (555) the QPs for macroblocks in each of plural color channels.

The tool signals (605) frame-level information for QP variation within one or more of the channels. For example, the tool signals at the frame level the number of bits used to define macroblock QPs relative to the frame QP for each of the channels. Alternatively, the tool signals information indicating a QP index table and populates the table with a plurality of values for different QPs, which can include the channel QP. A different table is indicated for each of the color channels or, alternatively, two or more of the color channels can share a table. Additionally, one or more of the colors channels may not vary spatially over the frame, and so only a single QP may be indicated for that channel.

On a macroblock-by-macroblock basis, the tool signals (615) information for the QP of the next macroblock. In one embodiment, the tool signals whether the actual QP of the macroblock is the same as the macroblock's predicted QP, which can be the QP of the frame for the color channel or a spatially predicted value for the QP of the macroblock. Macroblock QP prediction rules vary depending on implementation. If the actual QP is not the same as the predicted QP, the tool then signals a difference value between the QP of the macroblock and the predicted QP. Alternatively, the tool signals whether the actual QP of the macroblock is equal to the macroblock's predicted QP, which again can be the QP of the frame for the color channel or a spatially predicted QP value for the macroblock. If the macroblock QP is not equal to the predicted QP, then the tools signals that the QP of the macroblock is one of a plurality of QP values in a QP index table.

After the tool has signaled information for the QP of the macroblock in the given color channel, the tool checks (620) whether there is another color channel with a spatially varying QP. If there are one or more other color channels whose QPs have not been signaled, then the tool performs the signaling (615) step for the macroblock in the next color channel. If there is not another color channel with a spatially varying QP, the tool checks (625) whether there is another macroblock in the frame. The macroblocks can be checked according to a raster scan order or some other order. If there is another macroblock in the channel whose QPs have not been signaled, then the tool performs the signaling (615) and checking (620) steps for the next macroblock. If there is no other macroblock in the frame, then the tool is done signaling the QPs for macroblocks in each color channel of the frame.

D. OP Signaling for Macroblocks in the Frame.

FIG. 6b is a flowchart showing details (630) of one approach to signaling (535) the spatially varying QPs of the macroblocks in the frame.

As a first step, the tool signals (635) frame-level information for QP spatial variation over the frame. For example, the tool signals at the frame level the number of bits used to define macroblock QPs relative to the frame QP. Alternatively, the tool signals information indicating a QP index table and populates the table with a plurality of values for different QPs.

On a macroblock-by-macroblock basis, the tool signals (645) information for the QP of the next macroblock. The tool signals whether the QP of the macroblock is to the same as the macroblock's predicted QP, which can be the QP of the frame or a spatially predicted value for the QP of the macroblock. Macroblock QP prediction rules vary depending on implementation. If the actual QP is not the same as the predicted QP, the tool signals a difference value between the QP of the macroblock and the predicted QP. Alternatively, if the macroblock QP is not equal to one the predicted QP, then the tool signals that the QP of the macroblock is one of a plurality of QP values in a QP index table.

After the tool has signaled information for the QP of the macroblock for the frame, the tool checks (650) whether there is another macroblock in the frame. The macroblocks can be checked according to a raster scan order or some other order. If there is another macroblock in the frame, then the tool performs the signaling (645) step for the next macroblock. If there is not another macroblock in the frame, then the tool finishes.

E. Generalized Decoding Technique.

Figure 7:
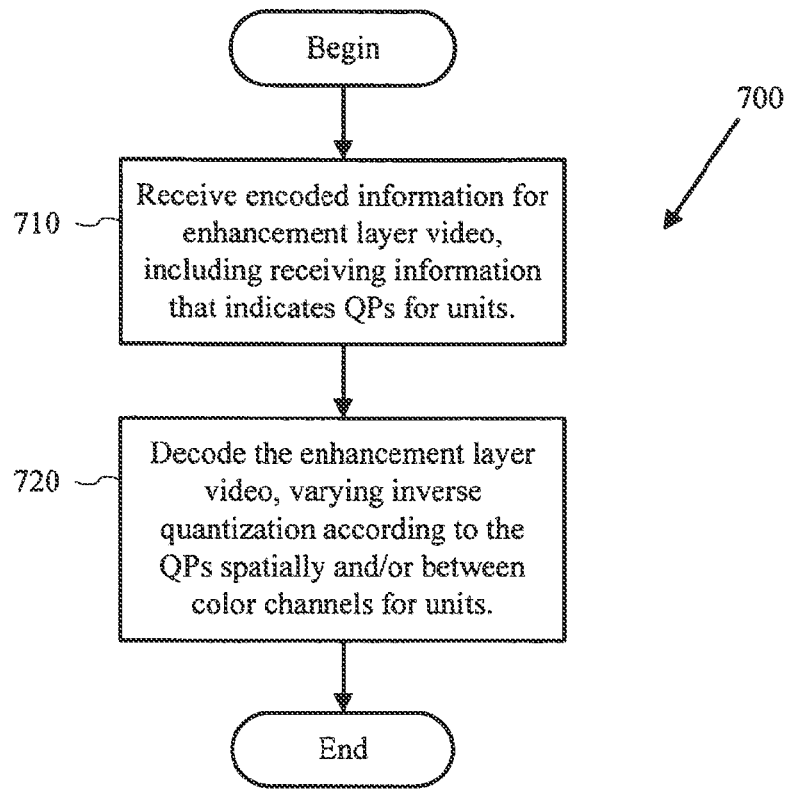
FIG. 7 is a flow chart of a generalized technique for decoding enhancement layer video quantized with one or more QPs that vary spatially and/or across color channels of a picture.

FIG. 7 shows a general method (700) for decoding enhancement layer video with inverse quantization that varies spatially across a picture or across color channels of the picture. A decoding tool (300), such as the one described with reference to FIG. 3, is used to perform the technique (700), or some other tool may be used.

The decoding tool receives (710) encoded information in a bit stream for enhancement layer video. The encoded information includes information that indicates QPs for units (e.g., macroblocks, blocks) of a picture or its channels. In some embodiments, the tool receives information signaled according to the techniques shown in FIGS. 5, 6A and 6B, receiving syntax elements that are signaled, evaluating the syntax elements and following the appropriate conditional bit stream paths, to determine QPs that vary spatially and/or between channels of a picture. Alternatively, the tool receives QP information signaled according to another approach.

The tool then decodes (720) the enhancement layer video. In doing so, the tool varies inverse quantization (according to the signaled QP information) spatially and/or between channels for units of the enhancement layer video.

The tool performs the technique (700) for a picture of the enhancement layer video and repeats the technique on a picture-by-picture basis. Alternatively, the tool performs the technique for a group of pictures, slice, or other section of video, and repeats the technique on that basis.

V. Predictive Coding and Decoding of Quantization Parameters

According to a second set of techniques and tools, an encoder predictively codes quantization parameters using spatial prediction. A corresponding decoder predicts the quantization parameters using spatial prediction during decoding. For example, the encoder and decoder predict a macroblock's QP using a QP prediction rule than considers QPs of spatially adjacent macroblocks within a picture or channel of a picture. Spatial prediction of QPs can be used to encode QPs that vary both spatially and between channels, or it can be used in encoding and decoding of other types of QPs.

A. Generalized Encoding.

Figure 8:
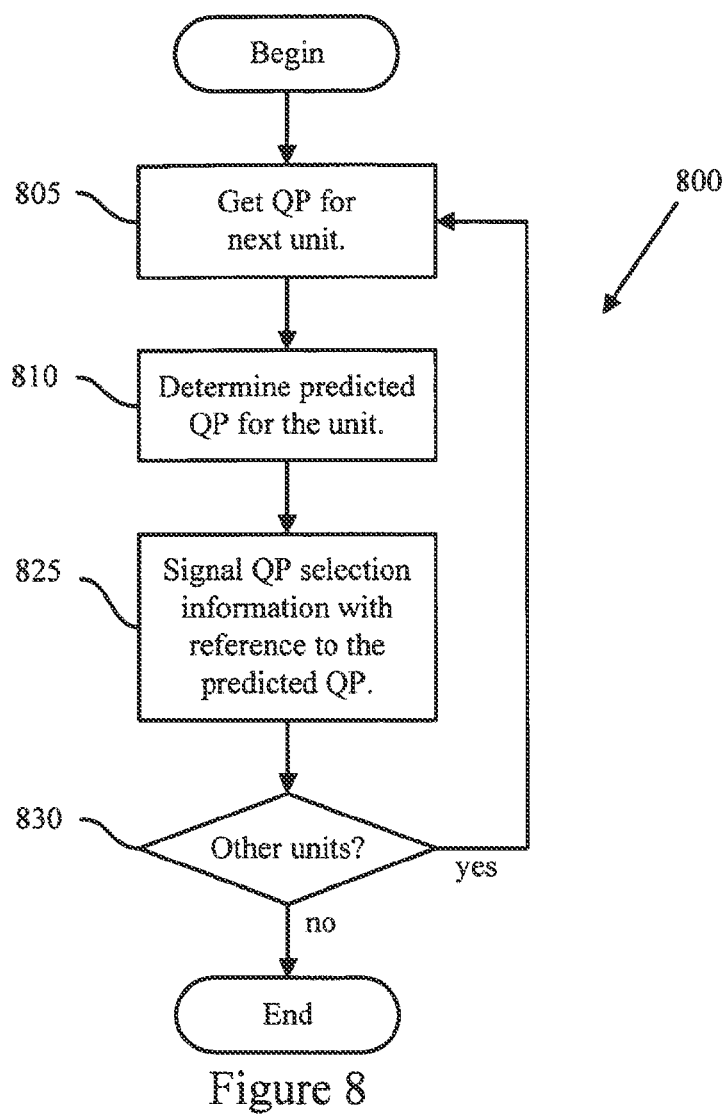
FIG. 8 is a flow chart of an generalized technique for using spatial prediction to encode and signal QPs for units of video.

FIG. 8 is a flowchart showing a generalized technique (800) for encoding and signaling QPs using spatial prediction. An encoding tool (200), such as that described with reference to FIG. 2 may be used to perform the method (800), or some other tool may be used. The technique (800) is described with reference to an entire picture, but the technique may be applied separately to each color channel in the picture.

The tool gets (805) the QP for the next unit in the picture. The unit can be a macroblock, block or other region of the picture. As the technique (800) addresses encoding and signaling of QP values, the encoder has already determined QPs of the units and the QP of the picture.

The tool determines (810) the predicted QP for the unit. The value of the predicted QP depends on the QP prediction rule in operation. Although the QP prediction rule depends on implementation, the encoder and decoder use the same QP prediction rule, whatever it happens to be. A first example prediction rule compares QPs of units to the left of the current unit and above the current unit. If the QPs of the two neighboring units are the same, the encoder uses that QP as the predicted QP. Otherwise, the encoder uses the picture QP as the predicted QP for the current unit. According to a second example prediction rule, the encoder uses the median QP among QPs for left, top, and top right neighbors as the predicted QP. Alternatively, the encoder uses another prediction rule, for example, considering a single neighbor's QP to be the predicted QP. For any of these example rules, the QP prediction rule addresses cases where one or more of the neighboring units are outside of a picture or otherwise have no QP, for example, by using the picture QP or other default QP as the predicted QP of the current unit, or by substituting a dummy QP value for the missing neighbor unit.

The tool signals (825) the QP for the unit with reference to the predicted QP. For example, the tool signals a single bit indicating whether or not the unit uses the predicted QP. If not, the tool also signals information indicating the actual QP for the unit. One approach to signaling the actual QP is to signal the difference between the QP for the unit and the predicted QP. Another approach is to signal a QP index that indicates an alternative QP in a table of QPs available to both the encoder and the decoder. Alternatively, instead of signaling the use/do-not-use selection decision separately from selection refinement information, the tool jointly signals the selection information, using a single code to indicate not to use the predicted QP and also indicating the actual QP to use.

The tool then checks (830) to see whether there are other units with QPs to be encoded in the picture (or channel). If there are other units, then the tool repeats the steps of getting (810) the QP for the next unit, determining (810) the predicted QP for that unit, and signaling (825) the QP for that unit.

B. Generalized Decoding.

Figure 10:
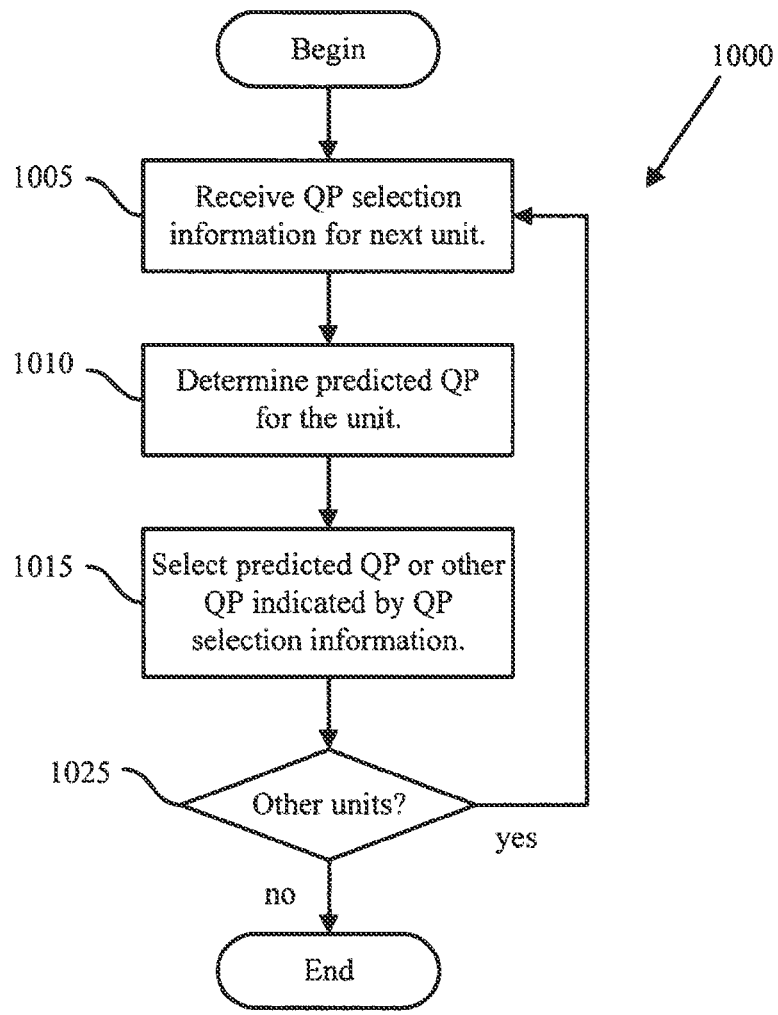
FIG. 10 is a flow chart of a generalized technique for using spatial prediction to decode QPs for units of video.

FIG. 10 is a flowchart showing a general technique (1000) for using spatial prediction to decode QPs for units of video A decoding tool, such as the decoding tool (300) described with reference to FIG. 3 or other decoding tool, performs the technique (1000). The technique (1000) is described with reference to an entire picture, but the technique may be applied separately to each color channel in the picture.

The tool receives (1010) QP selection information for the next unit (e.g., macroblock, block) in the picture. Generally, the selection information indicates whether the QP for the unit is the predicted QP or another QP, in which case the QP selection information also indicates what the other QP is. For example, the tool receives (as part of the QP selection information) a single bit indicating whether or not the unit uses the predicted QP. If not, the tool also receives (as part of the QP selection information) information indicating the actual QP for the unit. In a differential coding approach, the tool receives information indicating the difference between the QP for the unit and the predicted QP. In an alternative QP selection approach, the tool receives a QP index that indicates an alternative QP in a table of QPs available to both the encoder and the decoder. The QP selection information can include a separate decision flag and selection code, or it can include a single code that jointly represents the information.

The tool predicts (1010) the QP of the unit, and the value of the predicted QP depends on the QP prediction rule in operation. Any of the example QP prediction rules described with reference to FIG. 8, when used during encoding, is also used during decoding. Even when the predicted QP is not used as the actual QP for the current unit, the predicted QP is used to determine the actual QP. Alternatively, when the QP selection information indicates that a predicted QP is not used, the encoder skips determination of the predicted QP and decodes an independently signaled QP for the current unit.

The tool selects (1015) between the predicted QP and another QP, using the QP selection information. For example, the tool interprets part of the QP selection information that indicates whether or not the unit uses the predicted QP. If not, the tool also interprets additional QP selection information that indicates the other QP for the unit. In a differential coding approach, the tool combines a differential value and the predicted QP to determine the other QP. In an alternative QP selection approach, the tool looks up a QP index in a table of QPs available to determine the other QP.

The tool then checks (1025) whether there are other units with QPs to be reconstructed in the picture (or channel). If there are, then the tool repeats the steps of receiving QP selection information for the next unit, determining the predicted QP for that unit, and selecting the QP for that unit.

C. Exemplary Prediction Rules.

Figure 9:
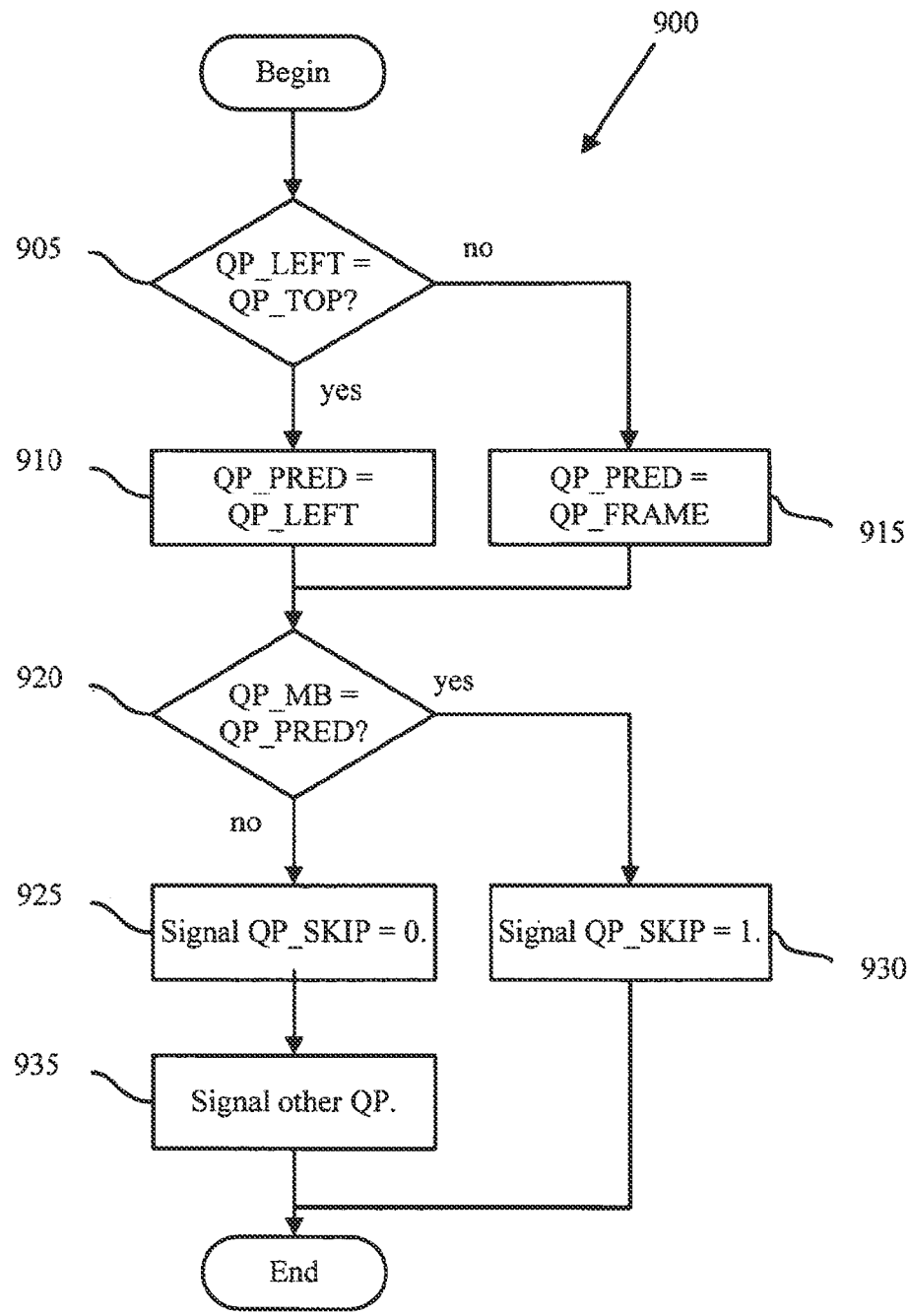
FIG. 9 is a flow chart of an exemplary technique of using spatial prediction to encode and signal a QP for a macroblock.

FIG. 9 is a flowchart illustrating a technique (900) for using an exemplary prediction rule for predicting the QP of a macroblock during encoding. An encoding tool, such as that described with reference to FIG. 2, performs the technique (900) when encoding and signaling the QP for a macroblock (QP_MB) in a frame or channel of the frame.

The tool first checks (905) whether the QP of a macroblock immediately to the left of the current macroblock (QP_LEFT) is the same as the QP of a macroblock immediately above the current macroblock (QP_TOP). QP_LEFT being equal to QP_TOP indicates a trend for the QPs of that particular section of the frame or color channel such that it is reasonable to assume that QP_MB, the QP of the current macroblock, is most likely close to, if not equal to, QP_LEFT. Thus, QP_PRED is set (910) to be equal to QP_LEFT. If QP_LEFT is not equal to QP_TOP, or if either QP_LEFT or QP_TOP is unavailable, then QP_PRED is set (915) to be equal to QP_FRAME, which is the default QP of the frame or color channel. Generally, QP_FRAME is equal to the average of the QPs for the frame or color channel, the most common QP in the frame or color channel, or some other value expected to reduce bit rate associated with signaling QPs for macroblocks.

In alternative QP prediction rules, QP_PRED is predicted according to the QPs of different macroblocks, such as QP_TOP and QP_BOTTOM (the QP of a macroblock directly below the current macroblock), QP_LEFT and QP_RIGHT (the QP of a macroblock directly to the right of the current macroblock), or some other combination of QPs in the frame or channel, depending on scan order followed in encoding QPs for the macroblocks. Or, QP_PRED is predicted with regard to only a single previously decoded QP (such as QP_LEFT), three previously decoded QPs, or some other combination of QPs. In some examples, the tool performs multiple checks to determine QP_PRED. For example, if QP_LEFT is not equal to QP_TOP_LEFT, the tool checks to determine whether QP_TOP_LEFT is equal to QP_TOP, and if so, sets QP_PRED equal to QP_LEFT (assuming horizontal continuity in QP values). In still other examples, QP_PRED is based on the QPs of other color channels or previously reconstructed macroblocks in other frames.

Returning to FIG. 9, the tool then checks (920) whether QP_MB is equal to QP_PRED. In areas of the frame or color channel with high levels of redundancy in QP values, QP_MB will most likely be equal to QP_PRED. In this instance, the tool signals (930) that QP_SKIP is 1. QP_SKIP is a one-bit indicator which, when set to 1, indicates that the current macroblock uses QP_PRED and the bit stream includes no other QP selection information for the current macroblock.

If QP_MB is not equal to QP_PRED, then the tool signals (925) that QP_SKIP is 0. Setting QP_SKIP to 0 indicates during encoding and decoding that QP_MB is not equal to the QP_PRED and therefore another QP is signaled (935) for QP_MB. In a differential coding approach, this other QP is signaled as a difference value relative to QP_PRED. In an alternate QP selection approach, QP_MB is signaled as one of a number of available QPs in a table of QP values. Or, the other QP is signaled in some other manner.

D. Treatment of Skip Macroblocks.

A QP prediction rule accounts for the unavailability of a neighbor QP by, for example, assigning a picture QP or other default QP to be the predicted QP for the current unit. In some implementations, an encoder and decoder reduce the frequency of unavailable QPs by buffering dummy QP values to units that otherwise lack QPs. For example, even if QP varies spatially in a frame or channel, some macroblocks may still be encoded and decoded without using a QP. For a skipped macroblock or macroblock for which all blocks are not coded (according to the coded block pattern for the macroblock), the bit stream includes no transform coefficient data and no QP is used. Similarly, when QP varies spatially and between channels, if a macroblock has transform coefficient data in a first channel but not a second channel (e.g., since the coded block status of the block(s) in the second channel is 0 in the coded block pattern), the bit stream includes no QP information for the macroblock in the second channel.

Thus, in some implementations, if QP is not available for a particular unit, the encoder and decoder infer the QP for the unit to be equal to the predicted QP for the unit, and the inferred value is used for subsequent QP prediction. For example, if a macroblock is skipped, the QP of the macroblock is set to be equal to the predicted QP for the macroblock, and the inferred QP value is buffered along with other actual QPs (and perhaps inferred QP values) for the frame.

VI. Combined Implementations

In first and second combined implementations, an encoder and decoder use QPs that vary spatially and/or between channels of enhancement layer video, and the encoder and decoder use spatial prediction when encoding and decoding values of QP for macroblocks. The encoder and decoder use the same QP prediction rule in the first and second combined implementations, although other QP prediction rules can instead be used. In the first combined implementation, when the predicted QP is not used for a macroblock, the actual QP for the macroblock is signaled differentially relative to the predicted QP. In contrast, in the second combined implementation, when the predicted QP is not used for a macroblock, the actual QP for the macroblock is signaled as an alternative QP index to a table of available QPs for the frame.

A. General Signaling in First and Second Combined Implementations.

In the first and second combined implementations, QP_FRAME_UNIFORM is a 1-bit frame level syntax element. It indicates whether QP varies spatially across the frame. If QP_FRAME_UNIFORM equals 0, then the QP varies spatially across the frame. If QP_FRAME_UNIFORM does not equal 0, then the QP does not vary spatially across the frame, and the encoder and decoder use simple frame-level signaling of frame QP.

Similarly, QP_CHANNEL_UNIFORM is a 1-bit frame level syntax element that indicates whether QP varies across the color channels of the frame. If QP_CHANNEL_UNIFORM equals 0, then QP varies across the color channels (in addition to potentially varying spatially within each channel). If QP_CHANNEL_UNIFORM does not equal 0, then QP does not vary across the color channels.

FIG. 11 illustrates bit stream syntax and pseudocode for receiving information that indicates frame QP and channel-specific QPs in first and second example combined implementations. FIGS. 11 through 16 show color channels for the YUV color space, but the pseudocode could be adapted to the RGB space, YCbCr, or some other color space.

If QP_CHANNEL_UNIFORM does not equal 0, then QP does not vary across the color channels, and the bit stream includes N bits signaling QP_FRAME. If QP_CHANNEL_UNIFORM equals 0 then the bit stream includes N bits for QP_FRAME_Y, N bits for QP_FRAME_U, and N bits for QP_FRAME_V. The value of N can be pre-defined, set for a sequence, or even set for a frame. Moreover, although FIG. 11 shows the same value of N bits for all types of QP, different numbers of bits can be used to signal QP_FRAME, QP_FRAME_Y, QP_FRAME_U, and/or QP_FRAME_V.

FIGS. 11 and 13 to 16 illustrate decoder-side operations to receive bit stream syntax elements and determine QPs of macroblocks. The corresponding encoder-side encoding and signaling operations mirror the operations shown in FIGS. 11 and 13 to 16. For example, instead of receiving information for a differential QP value (or alternate QP index) and decoding it, an encoder determines the differential QP value (or alternate QP index) and signals it.

B. Spatial Prediction Rule in First and Second Combined Implementations.

FIG. 12 shows an example QP prediction rule used by the encoder and the decoder in the first and second example combined implementations. The QP prediction rule generally corresponds to the rule explained with reference to steps (905, 910 and 915) of FIG. 9. For a current macroblock, if both the left neighboring macroblock and the top neighboring macroblock are available, and the two neighboring macroblocks have equal QPs, then this QP is used as the predicted QP for the current macroblock. If, however, QP_TOP is different from QP_LEFT, or if either of the neighbors is unavailable, the tool uses QP_FRAME (or the appropriate channel-specific QP_FRAME_value for the Y, U or V channel) as the predicted QP for the current macroblock.

Alternatively, the encoder and the decoder use a different QP prediction rule. For example, the encoder and decoder set the predicted QP for a current macroblock to be the median of QP values from the left, top and top-right neighbors. Or, the encoder and decoder set the predicted QP for a current macroblock to be QP_LEFT if the QP values from top-left and top neighbors are the same (showing a horizontal consistency trend), set the predicted QP for the current macroblock to be QP_TOP if the QP values from top-left and left neighbors are the same (showing a vertical consistency trend), and otherwise set the predicted QP for the current macroblock to be QP_FRAME.

C. Signaling OP Differentials in First Combined Implementation.

In a first scheme, the QP_MB is not the same as QP_PRED, the bit stream includes a differential value that indicates QP_MB relative to QP_PRED. Generally, the differential is signaled as a signed or unsigned integer according to a convention determined by the encoder and decoder.

FIG. 13 illustrates bit stream syntax and pseudocode for receiving information that indicates the number of bits used to differentially signal QP_MB for a frame or channels. The syntax elements shown in FIG. 13 are signaled at frame level in the bit stream. If QP_FRAME_UNIFORM=0, then QP varies spatially over the frame of enhancement layer video and thus QP_MB information is signaled at the macroblock level. If QP_FRAME_UNIFORM does not equal 0, then the QP of the frame (or channels) is signaled at the frame level of the bit stream.

If QP_CHANNEL_UNIFORM is not equal to 0, then the tool decodes NUM_BITS_QP_MB (3 bits). NUM_BITS_QP_MB (3 bits) is a 3-bit value that indicates the number of bits used to signal QP_MB differentials for macroblocks in a frame. This yields a number from 0 bits to 7 bits for differential QP_MB information. When the number of bits is 0, the predicted QP is always used for macroblocks, since no differential bits are allowed. At the other extreme, when the number of bits is 7, differentials within a range of $2^7=128$ steps relative to QP_PRED can be signaled. Depending on convention, the differential values can vary from −64 to 63 in integer QP steps, −32 to 95 in integer QP steps, −32 to 31.5 in half-QP steps, etc. In some implementations, the range is generally centered around QP_PRED (or differential of zero). Setting the number of bits used to signal differential QP_MB information trades off the costs of signaling the differential QP_MB information at higher resolution versus the quality benefits of using the greater range of QP or resolution of QP.

If QP_CHANNEL_UNIFORM is =0, then the tool decodes NUM_BITS_QP_MB_Y (3 bits), NUM_BITS_QP_MB_Y (3 bits), and NUM_BITS_QP_MB_Y (3 bits), which are 3-bit values that indicate the number of bits used to signal QP_MB differentials for macroblocks in the Y channel, the U channel, and the V channel, respectively. This yields a number from 0 bits to 7 bits for differential QP_MB information in the respective channels. Different channels do not need to use the same number of differential QP_MB bits as each other. For example, the Y channel may be much more complex than either the U channel or the V channel, and thus the Y channel may use 4 bits for differential QP_MB values whereas the U channel and the V channel each use 2 bits. By setting the number of differential QP_MB bits to zero for a channel, spatially adaptive quantization is effectively disabled for that channel.

FIG. 14 illustrates bit stream syntax and pseudocode for receiving information that indicates QP for each macroblock. FIG. 14 shows macroblock-level syntax elements. If QP_FRAME_UNIFORM is equal to 0, QP varies spatially over the frame. For a current macroblock, the bit stream includes a bit QP_SKIP, which is used to indicate whether QP_MB is equal to QP_PRED. If QP_SKIP is equal to 1, then QP_MB is set to be equal to QP_PRED. QP_SKIP=0 indicates that QP_MB is being signaled explicitly. If so, the next bit stream syntax elements depend on whether QP_CHANNEL_UNIFORM is equal to 0.

If QP_CHANNEL_UNIFORM is not equal to 0, then the bit stream includes DIFF_QP_MB (NUM_BITS_QP_MB bits). In the example of FIG. 13, NUM_BITS_QP_MB can be an integer from 0 to 7. For the current macroblock, DIFF_QP_MB represents the difference between QP_MB and QP_PRED. QP_MB is determined to be: QP_MB=DIFF_QP_MB+QP_PRED, where QP_PRED is the already predicted QP for the current macroblock.

If QP_CHANNEL_UNIFORM is equal to 0, then QP for the current macroblock varies across the different color channels of the frame, and so the bit stream includes DIFF_QP_MB_Y (NUM_BITS_QP_MB_Y bits), DIFF_QP_MB_U (NUM_BITS_QP_MB_U bits), and DIFF_QP_MB_V (NUM_BITS_QP_MB_V bits). In the example of FIG. 13, the number of bits for differential QP_MB per channel can be an integer from 0 to 7. DIFF_QP_MB_Y represents the difference between QP_MB_Y and QP_PRED_Y. QP_MB_Y=DIFF_QP_MB_Y+QP_PRED_Y. DIFF_QP_MB_U and DIFF_QP_MB_V represent similar values for the U and V channels, respectively.

This design allows for a very simple and efficient way to exploit inter-macroblock redundancy in QPs. Even when different color channels use different quantizers for a given macroblock, a 1-bit QP_SKIP element for the macroblock is sufficient to indicate that the QPs of the color channels are identical to the QPs of the corresponding color channels of a neighboring macroblock (such as the left or top neighbor). Further, prediction using a simple comparison and selecting a single neighboring macroblock's QP is simpler than blending two or more neighboring macroblocks—it eliminates the need for a median or averaging operation, and provides similar efficiency in compression. More complicated QP prediction rules can provide more accurate prediction at the cost of higher computational complexity.

In the approach shown in FIGS. 13 and 14, a simple fixed length coding (FLC) table (with code lengths that can vary from frame to frame or channel to channel) is used. For many distributions of differential QP_MB values, performance of such FLCs can be as good as a variable length coding. Alternatively, an encoder and decoder use variable length codes for differential QP_MB values.

Additionally, the ability to send the number of bits used to signal the differential QP provides an additional degree of flexibility in improving compression efficiency. If the macroblock QPs are very close to the frame QP, this proximity can be exploited by using only 1 or 2 bits to signal the differential QP_MBs for the macroblocks that do not use predicted QP. If the macroblock QPs are very different (in terms of having a larger range), more bits are used to signal the differential QP_MBs for the macroblocks.

The number of bits used to signal the differential QP_MBs for each color channel can also be different based on the characteristics of the respective macroblock QPs are for each channel. For example, if the QP of the U and V channels for all of the macroblocks remains the same, and the luma QP varies spatially for the macroblocks, the tool uses zero bits for signaling the differential QP_MB for each of the U and V channels, and 1 or more bits for signaling the differential QP_MBs of the Y channel.

D. Signaling Alternative OPs in Second Combined Implementation.

In the second combined implementation, if QP_SKIP is not equal to 1, then QP_MB is explicitly signaled using a QP index at the macroblock level. The QP index references a QP in a table of available QPs, which is signaled at frame level. FIG. 15 illustrates bit stream syntax and pseudocode for receiving information that specifies the QP values in the table for a frame (or tables for channels), then populating the QP table. FIG. 15 shows frame-level syntax elements.

If QP_FRAME_UNIFORM is equal to 0 (QP varies spatially across the frame) and QP_CHANNEL_UNIFORM is not equal to 0 (QP does not vary across the color channels in the frame), the bit stream includes syntax elements specifying the values of a QP table for the frame. NUM_QP_INDEX (3 bits) is a 3-bit value regulating the number of different QPs in the table for the frame. NUM_QP_INDEX has $2^3$-8 possible values, from 0 to 7. In other examples, NUM_QP_INDEX may be signaled using more or less bits.

The internal variable NUM_QP, also regulating the number of different QPs in the table, is equal to NUM_QP_INDEX+2, for a range of 2 to 9. The first QP in the QP index table, QP_MB_TABLE[0], is QP_FRAME, the default QP value for the frame. The available QPs are generally ordered from most frequent to least frequent, to facilitate effective variable length coding of QP indices at macroblock level. For example, in the tables shown in FIGS. 17A to 17F, a single bit is used to signal if QP_MB is equal to QP_MB_TABLE[0].

The remaining rows of the QP table are filled, from position 1 through the position NUM_QP-1, by receiving and decoding a QP value for each position. In FIG. 15, the bit stream includes 8 bits to signal the QP value of each position in the table, though in other examples more or less bits can be used. In FIG. 15, the QP index table is produced with QP_FRAME at position 0 in the table and signaled QP values at each of the other positions in the table from 1 to NUM_QP_INDEX+1.

If QP_CHANNEL_UNIFORM is equal to 0 (QP varies across the color channels in the frame), the bit stream includes syntax elements to populate a QP table for each of the Y, U, and V color channels in the frame. For each channel, the positions of the table are filled with the channel-specific QP and alternate QPs.

FIG. 16 illustrates bit stream syntax and pseudocode for receiving information that indicates QP for a macroblock, then determining the QP, in the second combined implementation. FIG. 16 shows macroblock-level syntax elements. QP_SKIP is used as in the first combined implementation. Again, if QP_SKIP is equal to 1 for a current macroblock, then QP_MB=QP_PRED for that macroblock. If QP_SKIP is not equal to 1, then additional information indicating QP_MB is signaled explicitly for the macroblock. In the second combined implementation, however, the tool signals the non-predicted QP with reference to the QP table established at the frame level.

When QP_CHANNEL_UNIFORM indicates QP does not vary between channels, NUM_QP_EFFECTIVE, an internal counter, equals NUM_QP−1 (where NUM_QP is set from frame-level information in the bit stream, as in FIG. 15). This establishes the count of alternate QP values stored in the QP table for the frame. For example, if NUM_QP is equal to 9, then the QP table has 8 alternate QP values, the frame QP value at position 0 and 8 alternate QP values at positions 1-8 in the table. Thus, NUM_QP_EFFECTIVE is equal to 8. QP_ID is a value that is used to locate a QP in the QP table. Initially, QP_ID is 0.

If NUM_QP_EFFECTIVE is greater than 1, the QP table comprises the default value and at least two alternate values at positions 1 and 2, and a variable length code ("VLC") in the bit stream indicates the QP_ID (index of position in the QP table) of the QP to use for the macroblock. FIGS. 17A-F show several examples of VLC tables that may be used for variable length coding and decoding. For example, FIG. 17A shows a VLC table (1700) corresponding to NUM_QP_EFFECTIVE=2, wherein the VLC table (1700) comprises a QP_ID of 0 corresponding to a VLC of 0. The VLC table (1700) further comprises a QP_ID of 1 corresponding to a VLC of 1. Similarly, FIG. 17B shows a VLC table (1705) corresponding to NUM_QP_EFFECTIVE=3, with VLCs s for QP_IDs of 0, 1, and 2. FIGS. 17C-F show VLC tables (1710, 1715, 1720, 1730) corresponding to NUM_QP_EFFECTIVE=4, 5, 6, and 7, respectively. Typically, the most common QP_ID values in the frame or color channel are positioned near the top of the VLC tables, so that the most common QP_IDs are signaled using fewer bits. Alternatively, the encoder and decoder use other VLCs to represent QP_IDs. Instead of using different VLC tables for different values of NUM_QP_EFFECTIVE, the encoder and decoder can use a single table, but changing multiple tables typically results in slightly more efficient signaling. (For example, compare VLCs lengths for QP_ID==1 in the different VLC tables in FIGS. 17A and 17B.)

There is no VLC table for NUM_QP_EFFECTIVE=1 because, if a QP table has only the QP_FRAME (or channel QP) and one alternate QP, the non-predicted QP can be inferred to be the QP that is not the predicted QP. In other words, QP_PRED for the current macroblock is one of the two QP values in the table. If the macroblock does not use QP_PRED (i.e., QP_SKIP==0), then the only other option for the macroblock is the other QP in the QP table, and no VLC is included in the bitstream for QP_ID.

If NUM_QP_EFFECTIVE is greater than 1, the bit stream includes a VLC associated with a QP_ID in one of the VLC tables, where NUM_QP_EFFECTIVE indicates the table to use. For example, if NUM_QP_EFFECTIVE is equal to 4 and the tool decodes the Huffman code 110, then the tool determines the corresponding QP_ID of 2 from the table (1710) shown in FIG. 17C. When NUM_QP_EFFECTIVE is equal to 4, the number of alternate QP values in the QP table is 4, and the QP table also includes the QP_FRAME. Thus, the QP_IDs in the QP table are 0, 1, 2, 3 and 4. The corresponding VLC table includes only four positions, however, because a position is not needed for the predicted QP, which could have ID of 0, 1, 2, 3 or 4 in the QP table. This helps reduce overall bit rate associated with signaling QP_IDs.

Thus, whether or not NUM_QP_EFFECTIVE is greater than 1, the decoding tool determines the ID of the QP_PRED, which is shown as QP_PRED_ID. The tool then checks whether the signaled QP_ID (or initialized QP_ID) is greater than QP_PRED_ID. If so, then the tool increments QP_ID. If not, then the tool does not increment QP_ID. Once the tool has determined the appropriate QP_ID, the tool determines QP_MB with the value in the QP table indicated by QP_ID.

For example, if the predicted QP for a current macroblock has a QP_PRED_ID of 1 and NUM_QP_EFFECTIVE is 1, QP_ID retains its initial value of 0 and references the other (non-predicted) QP in the QP table with two available QPs. If the QP_PRED_ID of the predicted QP is 0, QP_IP is incremented and references the other (non-predicted) QP in the QP table with two available QPs.

As another example, let QP_PRED_ID be equal to 2 for a current macroblock. If the tool receives a VLC that indicates QP_ID of 0 in the table (1715) shown in FIG. 17D, since QP_ID<QP_PRED_ID, the tool looks up the value QP_ID of 0 in the QP table. In contrast, if the tool receives a VLC that indicates QP_ID of 4 in the table (1715) shown in FIG. 17D, the tool increments the QP_ID and looks up the value QP_ID of 4 in the QP table. By exploiting the fact that signaled QP_ID values need not include QP_PRED_ID as a possible choice, overall bit rate associated with signaling QP_ID values is reduced.

If QP_CHANNEL_UNIFORM is equal to 0 (QP varies between channels), then this process is performed for the macroblock in each color channel of the frame where QP_SKIP is not equal to 1.

The approach of the second combined implementation is particularly useful if a small set of QP choices in a wide range are desired for QPs for macroblocks in the frame or color channel. For example, if certain sections of the frame or color channel are very complex spatially or temporally while other sections of the frame or color channel are relatively uniform, this scheme may help improve overall compression of the frame of enhancement layer video. This technique also exploits inter-macroblock redundancy within sections, allows for signaling of the most common macroblock QPs using the shortest VLC codes, and, in certain cases, improves performance by using a VLC code for a lower QP_ID to signal a QP_ID that is actually higher.

VII. Alternatives

Although many of the examples presented herein relate to encoding and decoding of enhancement layer video, the techniques and tools described herein for spatial prediction of QPs can be applied to other types of video more generally. Similarly, the techniques and tools described herein for varying QP spatially and/or across channels can be applied to other types of video more generally.

Many of the examples of QP prediction involve spatial prediction of a single predicted QP for a current unit. Alternatively, an encoder and decoder compute multiple predictors for a current unit, and the bit stream includes information indicating a selection of the predicted QP for the current unit from among the multiple predictors. As another alternative, instead of performing spatial prediction of QPs, the encoder and decoder use temporal prediction from co-located macroblocks in other pictures, or use prediction of QPs of macroblocks in one channel from QPs of co-located macroblocks in another color channel.

In view of the many possible embodiments to which the principles of the disclosed invention may be applied, it should be recognized that the illustrated embodiments are only preferred examples of the invention and should not be taken as limiting the scope of the invention. In some cases certain steps in the above described techniques can be omitted or repeated. Rather, the scope of the invention is defined by the following claims. We therefore claim as our invention all that comes within the scope and spirit of these claims.

We claim:

1. In a computer system that implements a video encoder, a method comprising:
   receiving a picture organized in multiple channels, the multiple channels including a luma channel and two chroma channels;
   encoding the picture, thereby producing encoded data for the picture, wherein the encoding includes varying quantization spatially and between the multiple channels of the picture, and wherein the encoding further includes, for a current unit of the picture:
      predicting a unit-level quantization parameter ("QP") for the current unit using multiple unit-level QPs for spatially neighboring units;
      determining a differential QP between the unit-level QP for the current unit and the predicted unit-level QP for the current unit; and
      encoding the differential QP; and
   outputting, as part of a bitstream, the encoded data for the picture, the encoded data for the picture including QP information that indicates multiple QPs that at least in part parameterize the varied quantization of the picture, the QP information including the unit-level QP for the current unit signaled, relative to the predicted unit-level QP for the current unit, as the encoded differential QP.

2. The method of claim 1, wherein the encoding the picture further includes determining whether to use spatial quantization variation for the picture based at least in part on a user setting that controls speed and complexity of the encoding.

3. The method of claim 1, wherein the encoding the picture further includes determining whether to use spatial quantization variation for the picture based at least in part on analysis of complexity and spatial variance of the picture.

4. The method of claim 1, wherein the encoding the picture further includes performing the quantization on transform coefficients of units of the picture.

5. The method of claim 1, wherein the QP information further comprises picture-level information that indicates one or more picture-level QPs for the picture or respective channels of the picture.

6. The method of claim 1, wherein the spatially neighboring units include a left unit that is to the left of the current unit and an above unit that is above the current unit, and wherein the predicting the unit-level QP for the current unit uses one or more prediction rules based upon QP for the left unit and QP for the above unit.

7. The method of claim 6, wherein, according to the one or more prediction rules, when the QP for the left unit equals the QP for the above unit, then the predicted unit-level QP for the current unit is the QP for the left unit.

8. The method of claim 6, wherein, according to the one or more prediction rules:
   when the QP for the left unit is not available, another QP is substituted for the QP for the left unit; and
   when the QP for the above unit is not available, another QP is substituted for the QP for the above unit.

9. The method of claim 1, wherein the encoding the picture further includes:
   determining whether to use spatial quantization variation for the picture; and
   determining whether to use quantization variation between channels; and
   wherein the encoded data further includes:
      information that indicates whether the spatial quantization variation is used; and
      information that indicates whether the quantization variation between channels is used.

10. One or more non-transitory computer-readable media having stored thereon computer-executable instructions for causing one or more processors, when programmed thereby, to perform operations of a video decoder, the operations comprising:
    receiving, from a bitstream, encoded data for a picture organized in multiple channels, the multiple channels including a luma channel and two chroma channels, the encoded data including quantization parameter ("QP") information that indicates multiple QPs that at least in part parameterize inverse quantization of the picture, the QP information including an encoded differential QP for a unit-level QP for a current unit of the picture; and
    decoding the encoded data to reconstruct the picture, wherein the decoding the encoded data includes varying inverse quantization spatially and between the multiple channels of the picture, and wherein the decoding the encoded data further includes, for the current unit:
       decoding the encoded differential QP;
       predicting the unit-level QP for the current unit using multiple unit-level QPs for spatially neighboring units; and
       combining the predicted unit-level QP for the current unit with the decoded differential QP.

11. The one or more computer-readable media of claim 10, wherein the decoding the encoded data further includes performing the inverse quantization on quantized transform coefficients of units of the picture.

12. The one or more computer-readable media of claim 10, wherein the QP information further comprises picture-level information that indicates one or more picture-level QPs for the picture or respective channels of the picture.

13. The one or more computer-readable media of claim 10, wherein the spatially neighboring units include a left unit that is to the left of the current unit and an above unit that is above the current unit, and wherein the predicting the unit-level QP for the current unit uses one or more prediction rules based upon QP for the left unit and QP for the above unit.

14. The one or more computer-readable media of claim 13, wherein, according to the one or more prediction rules, when the QP for the left unit equals the QP for the above unit, then the predicted unit-level QP for the current unit is the QP for the left unit.

15. The one or more computer-readable media of claim 13, wherein, according to the one or more prediction rules:
    when the QP for the left unit is not available, another QP is substituted for the QP for the left unit; and
    when the QP for the above unit is not available, another QP is substituted for the QP for the above unit.

16. The one or more computer-readable media of claim 10, wherein the encoded data further includes information in the bitstream that indicates whether spatial quantization variation is used for the picture, and wherein the decoding further comprises determining whether to use the spatial quantization variation for the picture.

17. Computer-readable memory having stored therein encoded data in a bitstream for a picture organized in multiple channels, the multiple channels including a luma channel and two chroma channels, the encoded data including quantization parameter ("QP") information that indicates multiple QPs that at least in part parameterize inverse quantization of the picture, the QP information including an encoded differential QP for a unit-level QP for a current unit of the picture, and the encoded data being used by a video decoder, executing computer-executable instructions in a computer system comprising one or more processing units, in operations including, for the current unit:
    decoding the encoded differential QP;
        predicting the unit-level QP for the current unit using multiple unit-level QPs for spatially neighboring units; and
        combining the predicted unit-level QP for the current unit with the decoded differential QP.

18. The computer-readable memory of claim 17, wherein the QP information further comprises picture-level information that indicates one or more picture-level QPs for the picture or respective channels of the picture.

19. The computer-readable memory of claim 17, wherein the spatially neighboring units include a left unit that is to the left of the current unit and an above unit that is above the current unit, and wherein the predicting the unit-level QP for the current unit uses one or more prediction rules based upon QP for the left unit and QP for the above unit.

20. The computer-readable memory of claim 17, wherein the encoded data further includes information in the bitstream that indicates whether spatial quantization variation is used for the picture.

\* \* \* \* \*